(12) United States Patent
Choe et al.

(10) Patent No.: US 10,868,959 B2
(45) Date of Patent: Dec. 15, 2020

(54) METHOD FOR PROCESSING IMAGE AND ELECTRONIC DEVICE FOR SUPPORTING SAME

(71) Applicant: Samsung Electronics Co., Ltd., Gyeonggi-do (KR)

(72) Inventors: Jihwan Choe, Gyeonggi-do (KR); In Sun Song, Gyeonggi-do (KR); Jae Hyun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 16/073,378

(22) PCT Filed: Dec. 22, 2016

(86) PCT No.: PCT/KR2016/015136
§ 371 (c)(1),
(2) Date: Jul. 27, 2018

(87) PCT Pub. No.: WO2017/142182
PCT Pub. Date: Aug. 24, 2017

(65) Prior Publication Data
US 2019/0037138 A1     Jan. 31, 2019

(30) Foreign Application Priority Data

Feb. 17, 2016 (KR) .......................... 10-2016-0018346

(51) Int. Cl.
*H04N 5/232* (2006.01)
*H04N 5/77* (2006.01)
(Continued)

(52) U.S. Cl.
CPC ....... *H04N 5/23238* (2013.01); *G06T 3/4038* (2013.01); *H04N 5/23216* (2013.01);
(Continued)

(58) Field of Classification Search
CPC .............. G06T 3/4038; H04N 5/23216; H04N 5/23232; H04N 5/23238; H04N 5/272; H04N 5/77; H04N 5/919
See application file for complete search history.

(56) References Cited

U.S. PATENT DOCUMENTS 6,456,323 B1 *  9/2002  Mancuso .............. G06T 3/4038
                                              348/218.1
6,618,511 B1 *  9/2003  Mancuso .............. G06T 3/4038
                                              348/218.1
(Continued)

FOREIGN PATENT DOCUMENTS

CN      101866482 A       10/2010
EP      2 453 645 A1       5/2012
(Continued)

OTHER PUBLICATIONS

Terminal Equipment and Protocols for Telematic Services; International Telecommunication Union; The International Telegraph and Telephone Consultative Committee; CCITT T.81 (Sep. 1992); XP055511730 (Year: 1992).*
(Continued)

*Primary Examiner* — Zaihan Jiang
(74) *Attorney, Agent, or Firm* — Cha & Reiter, LLC

(57) ABSTRACT

Disclosed is an electronic device including a memory that stores at least one command associated with an image encoding and a processor electrically connected to the memory. The command executed while the processor is operated divides a content generation buffer allocated in association with a specified content generation into a plurality of partial areas, stitches a previous image and a present image with respect to at least a portion of an area in which the present image overlaps with the previous image, and performs a parallel encoding on each of the partial areas of (Continued)

the stitched images in a specified block size when the stitched images are stored in the content generation buffer.

21 Claims, 9 Drawing Sheets

(51) Int. Cl.
*H04N 3/40* (2006.01)
*H04N 5/272* (2006.01)
*G06T 3/40* (2006.01)
*H04N 5/919* (2006.01)

(52) U.S. Cl.
CPC ......... *H04N 5/23232* (2013.01); *H04N 5/272* (2013.01); *H04N 5/77* (2013.01); *H04N 5/919* (2013.01)

(56) References Cited

U.S. PATENT DOCUMENTS

| | | | |
|---|---|---|---|
| 6,677,981 B1 * | 1/2004 | Mancuso | G06T 3/4038 348/36 |
| 6,717,608 B1 * | 4/2004 | Mancuso | G06T 3/4038 345/427 |
| 6,771,304 B1 * | 8/2004 | Mancuso | G06T 3/403 348/39 |
| 6,885,392 B1 * | 4/2005 | Mancuso | G06T 3/4038 348/218.1 |
| 7,424,218 B2 | 9/2008 | Baudisch et al. | |
| 8,538,180 B2 | 9/2013 | Zhu et al. | |
| 8,629,897 B2 | 1/2014 | Yamashita et al. | |
| 9,066,111 B2 | 6/2015 | Niemi et al. | |
| 9,131,152 B2 * | 9/2015 | Arai | H04N 5/23238 |
| 9,538,084 B2 * | 1/2017 | Goto | G03B 37/02 |
| 10,116,864 B2 * | 10/2018 | Goto | G03B 37/02 |
| 2003/0220971 A1 * | 11/2003 | Kressin | H04L 12/1822 709/204 |
| 2004/0001091 A1 * | 1/2004 | Kressin | H04N 7/148 715/753 |
| 2007/0025723 A1 * | 2/2007 | Baudisch | G03B 17/18 396/287 |
| 2009/0262180 A1 | 10/2009 | Kim et al. | |
| 2009/0284582 A1 * | 11/2009 | Mei | H04N 5/23293 348/36 |
| 2011/0058014 A1 | 3/2011 | Yamashita et al. | |
| 2012/0099655 A1 | 4/2012 | Niemi et al. | |
| 2012/0120187 A1 * | 5/2012 | Goto | H04N 5/23293 348/36 |
| 2012/0155767 A1 | 6/2012 | Zhu et al. | |
| 2012/0213448 A1 * | 8/2012 | Malmborg | H04N 19/85 382/234 |
| 2013/0258383 A1 * | 10/2013 | Nitta | G06T 3/60 358/1.13 |
| 2014/0098187 A1 | 4/2014 | Yamashita et al. | |
| 2014/0285637 A1 * | 9/2014 | Cheng | H04N 13/221 348/50 |
| 2014/0351073 A1 * | 11/2014 | Murphy | G01B 11/02 705/23 |
| 2016/0047759 A1 * | 2/2016 | Wang | G06T 3/4069 378/11 |
| 2016/0088287 A1 * | 3/2016 | Sadi | G03B 35/08 348/43 |
| 2017/0070675 A1 | 3/2017 | Goto et al. | |

FOREIGN PATENT DOCUMENTS

| | | |
|---|---|---|
| GB | 2 348 074 A | 9/2000 |
| KR | 10-2011-0056953 A | 5/2011 |
| KR | 10-1265613 B1 | 5/2013 |
| KR | 10-2013-0103939 A | 9/2013 |
| KR | 10-1309664 B1 | 9/2013 |
| KR | 10-1473215 B1 | 12/2014 |
| KR | 10-2015-0037975 A | 4/2015 |

OTHER PUBLICATIONS

"Terminal Equipment and Protocols for Telematic Services"; International Telecommunication Union; The International Telegraph and Telephone Consultative Committee; XP055511730.
European Search Report dated Oct. 24, 2018.
Chinese Search Report dated Jul. 3, 2020.

* cited by examiner

METHOD FOR PROCESSING IMAGE AND ELECTRONIC DEVICE FOR SUPPORTING SAME

CLAIM OF PRIORITY

This application is a National Phase Entry of PCT International Application No. PCT/KR2016/015136, which was filed on Dec. 22, 2016 and claims a priority to Korean Patent Application No. 10-2016-0018346, which was filed on Feb. 17, 2016, the contents of which are incorporated herein by reference.

TECHNICAL FIELD

Various embodiments relate to an image processing technology.

BACKGROUND ART

An electronic device acquires an image through a camera or the like. The electronic device encodes the acquired image using a predetermined method and stores the encoded image.

DETAILED DESCRIPTION OF THE INVENTION

Technical Problem

Various embodiments provide an image processing method, which is capable of performing an efficient encoding operation in an image processing process, and an electronic device for supporting the same.

Technical Solution

An electronic device includes a memory that stores at least one command associated with an encoding of a collected image and a processor electrically connected to the memory. The command executed while the processor is operated classifies a content generation buffer allocated in association with a specified content generation into a plurality of partial areas, stitches a previous image and a present image with respect to an area in which the received present image overlaps with the previous image, and performs a parallel encoding on each of the partial areas of the stitched image in a specified block size when the stitched images are stored in the content generation buffer.

An image processing method by a processor of an electronic device includes dividing a content generation buffer allocated in association with a specified content generation into a plurality of partial areas, stitching a previous image and a present image with respect to an area in which the received present image overlaps with the previous image to store the stitched image in the content generation buffer, and performing a parallel encoding on each of the partial areas of the stitched image in a specified block size when the stitched images are stored in the content generation buffer.

Other aspects, advantages, and salient features of the disclosure will become apparent to those skilled in the art from the following detailed description, which, taken in conjunction with the annexed drawings, discloses various embodiments of the present disclosure.

Advantageous Effects of the Invention

Various embodiments as described above divide the stitched images into the partial areas and perform the parallel encoding on each partial area, and thus various embodiments may support the encoding to be effectively performed.

BEST MODE

Figure 1:
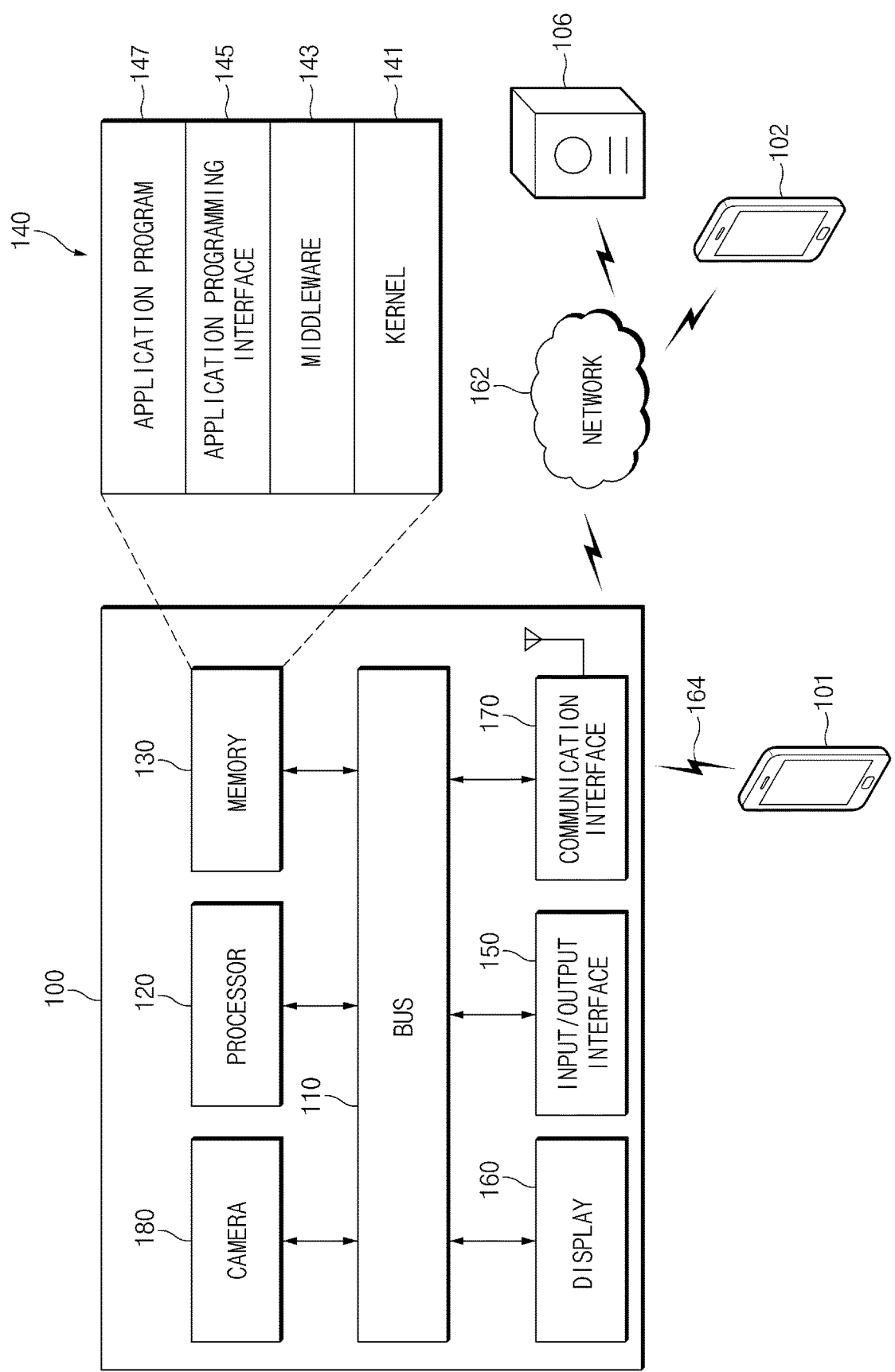
FIG. 1 is a block diagram showing an operating environment of an electronic device according to an exemplary embodiment of the present disclosure.

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a block diagram showing an operating environment of an electronic device according to an exemplary embodiment of the present disclosure.

Referring to FIG. 1, the operating environment of the electronic device according to an embodiment may include, for example, an electronic device 100, external electronic devices 101 and 102, a network 162, and a server 106. The above-mentioned operating environment of the electronic device 100 may support the electronic device 100 to acquire an image from the external electronic devices 101 and 102 or the server 106. As another way, the electronic device 100 may transmit image-processed contents to the external electronic devices 101 and 102 or the server 106. In this regard, the electronic device 100, the electronic devices 101 and 102, or the server 106 may be connected to each other through a network 162 or a short-range communication 164.

When the electronic device 100 according to an embodiment of the present disclosure includes a camera and performs operations of acquiring the image through the camera and storing the acquired image in a memory, the operating environment of the electronic device in association with the image processing operation may include only the electronic device 100 without including the external electronic devices 101 and 102, the network 162, and the server 106.

According to an embodiment, the electronic device 100 may include a bus 110, a processor 120, a memory 130, an input/output interface 150 (or input/output device), a display 160, a communication interface 170 (or a communication circuitry), and a camera 180.

The bus 110 may perform a signal transmission between components (e.g., the processor 120, the memory 130, the input/output interface 150, the display 160, the communication interface 170, and the camera 180) of the electronic device 100. For instance, the bus 110 may transmit at least one image collected by the camera 180 to the processor 120 and may transmit contents processed by the processor 120 to at least one of the memory 130 or the display 160. In addition, the bus 110 may transmit the contents processed by the processor 120 to the communication interface 170 that forms a communication channel with the external electronic devices 101 and 102 or the server 106.

The processor 120 may include, for example, one or more of a central processing unit (CPU), an application processor (AP), and a communication processor (CP). The processor 120 may perform, for example, a control of at least one other component(s) of the electronic device 100 and/or a computation or data processing on communications. According to an embodiment, the processor 120 may activate the camera 180 in response to a user's input and generate contents with a specified form based on a plurality of images acquired by the camera 180. For instance, the processor 120 may perform a sequential encoding operation (e.g., a JPEG encoding operation or a JPEG compression operation) while performing a stitching processing (e.g., an image registration processing (e.g., at least one processing for blending a periphery area between a source area and a target area among blending processings) stitching the images based on similar areas (e.g., edge areas between consecutive frames of at least two images among the images when continuous shooting is performed)) on the images.

When the image collection is completed, the processor 120 may integrate sequentially compressed areas to generate one content (e.g., a panoramic image) and may store the generated content in the memory 130 or output the generated content to the display 160. In the above-described operation, the processor 120 may divide images input thereto into partial areas having a certain size (e.g., areas corresponding to rows or columns defined by grouping a certain number of pixels into one group) and may perform a parallel encoding on each of the partial areas in a predetermined block unit (e.g., at least one encoding unit block, at least one partial area). The processor 120 may determine a size of the partial areas depending on a size of the encoding unit block or a size of the content that is to be generated.

The memory 130 may include a volatile and/or nonvolatile memory. For example, the memory 130 may store commands or data associated with at least one other component(s) of the electronic device 100. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 100 so as to control or manage system resources.

The middleware 143 may perform, for example, a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 100, to at least one of the application programs 147. For example, the middleware 143 may process the one or more task requests according to the priority assigned to the at least one, and thus it is possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a text control, or the like.

The memory 130 may store at least one image collected by the camera 180. For example, the memory 130 may store the content (e.g., a panoramic image) generated by concatenating a plurality of images. According to an embodiment, the memory 130 may include a content generation buffer (or buffer memory) with a specified size in which at least a portion of the images is stored. The content generation buffer with the specified size may be divided into a plurality of partial areas. For instance, the content generation buffer may include the partial areas obtained by dividing one side into a certain size, and the partial areas may include the certain number of pixels. For example, one partial area may include a sub-partial area corresponding to at least one encoding unit block, and the one encoding unit block may include the certain number of pixels (e.g., 16×16). The partial areas may have the same or similar size as each other. The content generation buffer may be used for stitching the images in which some areas are the same or similar and for encoding the stitched images. In addition, the areas, which are stitched, encoded, and disposed in the content generation buffer, may be integrated with each other when the image collection is finished and may be converted to one content (e.g., a panoramic image encoded by a specified manner).

The input/output interface 150 may perform, for example, an interface role that transmits commands received from a user or data received from other external devices to other components(s) of the electronic device 100. In addition, the input/output interface 150 may output commands or data received from other component(s) of the electronic device 100 to the user or other external devices. According to an embodiment, the input/output interface 150 may generate an input signal associated with the activation of the camera 180, an input signal requesting the generation of the content with the specified manner or selecting the specified manner, an input signal requesting the storage or output of the content, an input signal associated with the control of reproduction of the output content, and the like in response to the user's input. According to various embodiments, the input/output interface 150 may include an audio device. The audio device may output at least one audio information (e.g., pre-stored guide information or sound effect related to the shooting of the camera 180) related to an operation of the camera 180. As another example, the audio device may collect an audio signal when operating the camera 180.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to the user. The display 160 may include a touch screen and may receive, for example, a touch, gesture, proximity, or hovering input using an electronic pen or a portion of a user's body. According to an embodiment, the display 160 may output a user interface (e.g., a camera application execution screen) associated with the activation of the camera 180, a user interface associated with the collection of the content in the specified manner, and a user interface associated with the storage or output of the content in the specified manner, which is generated based on the images.

The communication interface 170 may establish, for example, a communication between the electronic device 100 and an external device (e.g., the second electronic device 102 or the server 106). For example, the communication interface 170 may be connected to the network 162 through wireless communication or wired communication to communicate with the external device (e.g., the second external electronic device 102 or the server 106).

The wireless communication may include at least one of, for example, a long-term evolution (LTE), an LTE-advanced (LTE-A), a code division multiple access (CDMA), a wideband CDMA (WCDMA), a universal mobile telecommunications system (UMTS, a wireless broadband (WiBro), a global system for mobile communications (GSM), or the like, as a cellular communication protocol. The communication interface 170 may include a short-range communication module (e.g., BT, WIFI communication hardware interface) to communicate with the first electronic device 101. According to various embodiments, the communication interface 170 may include at least one communication module to execute a near field communication (NFC), a magnetic stripe transmission (MST), a scanner communication, and the like. According to an embodiment, the communication interface 170 may transmit the content (e.g., a JPEG panoramic image) encoded by the specified manner in response to the control of the processor 120 to the external electronic devices (e.g., the first electronic device 101, the second electronic device 102, the server 106).

The camera 180 may be activated in response to the user's input or a setting of the electronic device and may acquire an image associated with an object. The camera 180 may transmit the acquired image to the processor 120. According to an embodiment, the camera 180 may collect the images in response to the user's input or may automatically collect the images at specified intervals. The camera 180 may sequentially transmit the images that are continuously taken in response to the user's input or images that are automatically and continuously taken to the processor 120. During auto-continuous shooting, the camera 180 may acquire several frame images or tens of frame images per second and may transmit, in sequential or real time, the acquired images to the processor 120.

In the above description, the camera 180 may be included in the electronic device 100, but the present disclosure should not be limited thereto or thereby. For instance, the camera 180 may be provided independently from the electronic device 180 and may transmit the taken or stored images to the electronic device 100 through the communication interface. According to an embodiment, the camera 180 may transmit at least one acquired image and at least one acquired preview image to the electronic device 100 based on a Bluetooth communication interface.

The processor 120 of the electronic device 100 may generate the content (e.g., the panoramic image described below) with the specified manner based on the images transmitted by the camera. In the process of generating the content, the processor 120 of the electronic device 100 may sequentially perform a buffering, stitching processing, or encoding operation on the received images. In this operation, the processor 120 of the electronic device 100 may select and operate an image, in which a range of the similar area is within a certain range, among the images.

Each of the first and second external electronic devices 101 and 102 may be a device whose type is different from or the same as that of the electronic device 100. According to an embodiment, the server 106 may include a group of one or more servers. According to various embodiments, all or a portion of operations executed by the electronic device 100 may be executed by another or plural electronic devices (e.g., the electronic devices 101 and 102 or the server 106). According to an embodiment, when the electronic device 100 is required to execute a certain function or service automatically or by a request, the electronic device 100 may request another device (e.g., the electronic device 101 or 102 or the server 106) to perform at least a portion of a function associated with the certain function or the service instead of internally or additionally performing the function or the service. The other electronic device (e.g., the electronic device 101 and 102 or the server 106) may execute the requested function or additional function and may transmit the execution result to the electronic device 100. The electronic device 100 may provide the requested function or service using the received result intactly or may additionally process the received result to provide the requested function or service. To this end, for example, cloud computing, distributed computing, or client-server computing may be used.

Figure 2:
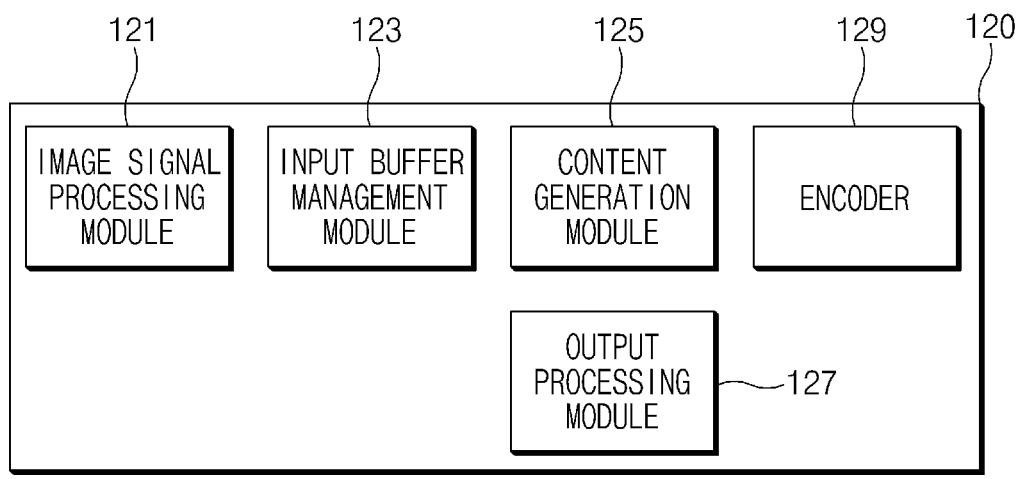
FIG. 2 is a block diagram showing a processor according to an exemplary embodiment of the present disclosure.

FIG. 2 is a block diagram showing a processor according to an exemplary embodiment of the present disclosure.

Referring to FIG. 2, the processor 120 according to an embodiment of the present disclosure may include an image signal processing module (e.g., ISP, image signal processor) 121, an input buffer management module 123, a content generation module 125, an encoder 129, and an output processing module 127. The modules included in the processor 120 may be implemented in at least one hardware or at least one software module.

The image signal processing module 121 may receive the image collected by the camera 180. The image signal processing module 121 may be a hardware module for post-processing the image received from the camera 180 and may be included in the camera 180 or the processor 120. The image signal processing module 121 may transmit the image received from the camera 180 to the input buffer management module 123.

The input buffer management module 123 may manage the image provided from the image signal processing module 121 as a stream. In this regard, the input buffer management module 123 may manage a frame buffer associated with the images. For instance, the input buffer management module 123 may manage the frame buffer in the form of a ring buffer. The input buffer management module 123 may transmit the image (e.g., the image stored in the buffer) to the content generation module 125 or the output processing module 127. The input buffer management module 123 may transmit data associated with the user interface to the output processing module 127.

The content generation module 125 may allocate a buffer that generates the content (e.g., the panoramic image). According to an embodiment, the content generation module 125 may obtain direction information (or shooting direction information) to acquire the image successively in association with the generation of the content with the specified manner. For example, the content generation module 125 may obtain movement direction information of the electronic device 100 using at least one sensor. In this regard, the electronic device 100 may include at least one sensor (e.g., an acceleration sensor, a geomagnetic sensor) to sense the movement direction. As another way, the content generation module 125 may obtain the movement direction information of the electronic device 100 based on an analyzed result of the image provided thereto. For example, the content generation module 125 may compare the images acquired during a predetermined time with each other to determine the direction information or may compare an image at a specified time point with an image after the specified time point to determine in which direction the electronic device 100 moves based on the changes in the images. For example, the content generation module 125 may extract feature points commonly contained in the images before and after the specified time point and may determine the change of the direction based on at least a portion of the feature points in the movement direction.

When the direction in which the image is successively acquired is determined, the content generation module 125 may allocate the content generation buffer corresponding to the determined direction. According to an embodiment, the content generation module 125 may allocate a size of the content generation buffer in a first direction (e.g., a left-and-right direction) and a size the content generation buffer in a second direction (e.g., an up-and-down direction) to be different from each other. For example, the content generation module 125 may allocate the size of the content generation buffer in the first direction to be larger than the size of the content generation buffer in the second direction. The content generation module 125 may divide the one side of the allocated content generation buffer into the encoding unit blocks with predetermined size and number or into the partial areas (e.g., plural encoding unit blocks are allocated to one partial area). The partial area may have the size determined depending on the image that is to be encoded.

The images stored in the partial areas may be encoded in parallel. In this operation, the images stored in the content generation buffer may be encoded by the specified encoding block unit within the partial areas in one direction. For example, when the image has a width of 3840 pixels and the encoding unit block is 16 by 16 (16×16), the content generation module 125 may divide the image into 240 (3840/16) sub-partial areas. The content generation module 125 may specify a certain number of sub-partial areas (e.g., 40 sub-partial areas) as the partial area and may allocate the image disposed in the specified partial areas to a certain number of threads. The number of threads may be changed depending on the number of partial areas. In this operation, the content generation module 125 may adjust the number of threads, which are processed in parallel, depending on the performance of the processor. For instance, when 240 sub-partial areas are processed in parallel using 6 threads, the content generation module 125 may allocate the partial areas such that each of the threads processes 40 sub-partial areas. As another way, the content generation module 125 may allow the threads, which have completed data processing faster than other threads, to process more sub-partial areas. According to various embodiments, regarding the generation of the content (e.g., the panoramic image) of the specified manner, as described above, the 240 sub-partial areas may be processed in 6 partial area units through the 6 threads with respect to an initial image. In the second image, which is stitched to the initial image, and subsequent images, the sub-partial areas, which are required to be stitched to a previous image and encoded, may be reduced by up-and-down shaking (e.g., the sub-partial areas to be processed later in the image may be reduced since the area to be stitched is valid only in areas overlapped with the previous image when the up-and-down shaking occurs. Accordingly, the content generation module 125 may encode the image with respect to the sub-partial areas (e.g., 220 sub-partial areas) smaller than 240 sub-partial areas when the images after the second image are input thereto. The content generation module 125 may appropriately allocate (e.g., uniformly or non-uniformly allocate the sub-partial areas in accordance with a data processing format supported by an operating system) 220 sub-partial areas to the specified number of threads (e.g., 6 threads).

The content generation module 125 may analyze and stitch the images provided from the input buffer management module 123. For example, the content generation module 125 may compare at least a portion of the previous image with at least a portion of a current image, extract areas having high similarity or the same feature points, and stitch the previous image and the current image based on the extracted areas. According to an embodiment, when it is determined that the images are to be acquired in the first direction, the content generation module 125 may compare the similarity between some areas in the right (or left) of the previous image and some areas in the left (or right) of the current image. According to various embodiments, the content generation module 125 may compare the similarity between some areas in the right (or left) edge of the previous image and some areas in the left (or right) edge of the current image. When it is determined that the images are to be acquired in the second direction, the content generation module 125 may compare the similarity between some areas in upper (or lower) side of the previous image and some areas in lower (or upper) side of the current image. The content generation module 125 may arrange the areas having high similarity among the previous image area and the current image area to overlap with each other and may arrange areas of a next image to overlap seriately. The content generation module 125 may perform the blending processing (e.g., the color processing to reduce difference between different images) on a boundary portion between the previous image and the current image, if necessary.

The content generation module 125 may identify a similar area ratio of the acquired images and may determine whether to stitch the images based on the similar area ratio. For example, the content generation module 125 may process the current image not to be used in the stitching operation when the similar area ratio between the previous image and the current image is equal to or greater than a predetermined ratio (e.g., when relatively large number of areas are similar, there is relatively no image area to expand through the stitching process). As another way, the content generation module 125 may select images having the similar area range of the specified ratio (e.g., about 30%, about 40%, about 50%, etc.) with respect to the previous image among the images after the previous image stored in the content generation buffer and may stitch the selected images to the previous image. The operation of selecting the images, which are to be stitched, may be performed by, for example, the input buffer management module 123.

The content generation module 125 may provide information about a portion, which is to be stitched, to the encoder 129 to support the encoding operation. According to various embodiments, the content generation module 125 may obtain information about block areas encoded by the encoder 129 and may calculate boundary areas to be stitched with respect to the next image based on the obtained block areas. When the collection of the image is completed, the content generation module 125 may control the integration processing for the content according to the completion of the image collection. For example, when the collection of the image is completed, the content generation module 125 may request the encoder 129 to perform the integration processing on the encoded blocks.

The encoder 129 may encode the image provided from the content generation module 125 to the content (e.g., the JPEG panoramic image) of the specified manner. The encoder 129 may be operated independently from the output processing module 127, and thus the encoder 129 may perform the encoding while a preview is on the display 160 by the output processing module 127, thereby quickly generating an encoding result file. The encoder 129 may allocate plural threads corresponding to the partial areas divided in the certain direction to the content generation buffer and may perform the parallel encoding to simultaneously encode the threads. In this case, the encoder 129 may encode the partial areas of the images allocated to each thread in the block unit of the specified size. For instance, the encoder 129 may encode the certain number (e.g., the number of threads supported by the processor) of partial areas, each to which the data of the 40 sub-partial areas (e.g., in a case that one pixel has a size of 3840) are allocated, in parallel based on the encoding unit block of 16 by 16 (16×16). As another way, the encoder 129 may perform the encoding on every stitching processing of the images that are consecutively received. The encoder 129 may perform the encoding on a block disposed at a first area among the partial areas of the next image with reference to the encoded block disposed at a last area among the partial areas of the previous image. According to various embodiments, the specified size of the encoding unit block may be changed to various sizes depending on a setting of the encoder 129.

When the encoder 129 receives a signal indicating an end of the image collection from the content generation module 125, the encoder 129 may allocate a header (e.g., a JPEG header) with respect to the content and may write a specified identifier (e.g., a restarter) in the last area of the partial areas of the encoded images. As another way, the encoder 129 may write an end identifier (e.g., an end of indicator) to indicate a last encoding block of the content. The specified identifier may indicate that the encoding is performed in corresponding partial areas. Accordingly, a decoding may be performed on each partial area while a corresponding content is reproduced, and the decoded image may be output to the display 160.

The output processing module 127 may perform processing for outputting the image provided from the input buffer management module 123 to the display 160. The output processing module 127 may generate a buffer of an image output to the display 160 in the form of preview. For example, the output processing module 127 may integrate the image provided from the input buffer management module 123, the user interface, and the content provided from the content generation module 125 and may store the integrated result in an image buffer (e.g., the image stored in the image buffer is output to the display). The output processing module 127 may be included in a hardware compositor, a GPU, and the like and may perform processings associated with the output of the image.

According to various embodiments, an electronic device may include a memory configured to store at least one command associated with an image encoding and a processor configured to be electrically connected to the memory, wherein the command executed while the processor is operated is configured to divide a content generation buffer allocated in association with a specified content generation into a plurality of partial areas, stitch a previous image and a present image with respect to at least a portion of an area in which a received present image overlaps with the previous image and perform a parallel encoding on each of the partial areas of the stitched images in a specified block size when the stitched images are stored in the content generation buffer.

According to various embodiments, wherein the command executed while the processor is operated is configured to determine an image acquiring direction associated with the content generation based on a variation in movement of received preview images or determine the image acquiring direction associated with the content generation using at least one sensor.

According to various embodiments, wherein the command executed while the processor is operated is configured to allocate a content generation buffer having a different size depending on the shooting direction.

According to various embodiments, wherein the command executed while the processor is operated is configured to allocate a content generation buffer having a first length in a first direction and a second length in a second direction with respect to a first shooting direction, or allocate a content generation buffer having a third length smaller than the first length in the first direction and the second length in the second direction with respect to a second shooting direction.

According to various embodiments, wherein the command executed while the processor is operated is configured to output an image, which is to be acquired, to a background area of a display and output the stitched images to the background area to be overlaid.

According to various embodiments, wherein the command executed while the processor is operated is configured to output a preview area having a ratio corresponding to an entire size of the content generation buffer to a display during the image collection or after the image collection.

According to various embodiments, wherein the command executed while the processor is operated is configured to output the preview area including a stitching area corresponding to the stitched images and a remaining area corresponding to the entire size of the content generation buffer.

According to various embodiments, wherein the command executed while the processor is operated is configured to, when the image collection for the stitching is ended, dispose a specified identifier, which indicates that a last block of the partial area is not used for processing a first block of another partial area, in the last block of each of the partial areas, dispose an end identifier, which indicates a last block of a last partial area of the content, in an area adjacent to the last block of the last partial area of the content and dispose header information corresponding to an entire content area in front of a first partial area.

According to various embodiments, wherein the command executed while the processor is operated is configured to select and stitch an image, in which a similar area with respect to the pervious image is within a certain range, among received images.

According to various embodiments, wherein the command executed while the processor is operated is configured to exclude an area of the present image having a height different from the previous image from a buffering of the content generation buffer when the image is stitched.

Figure 3:
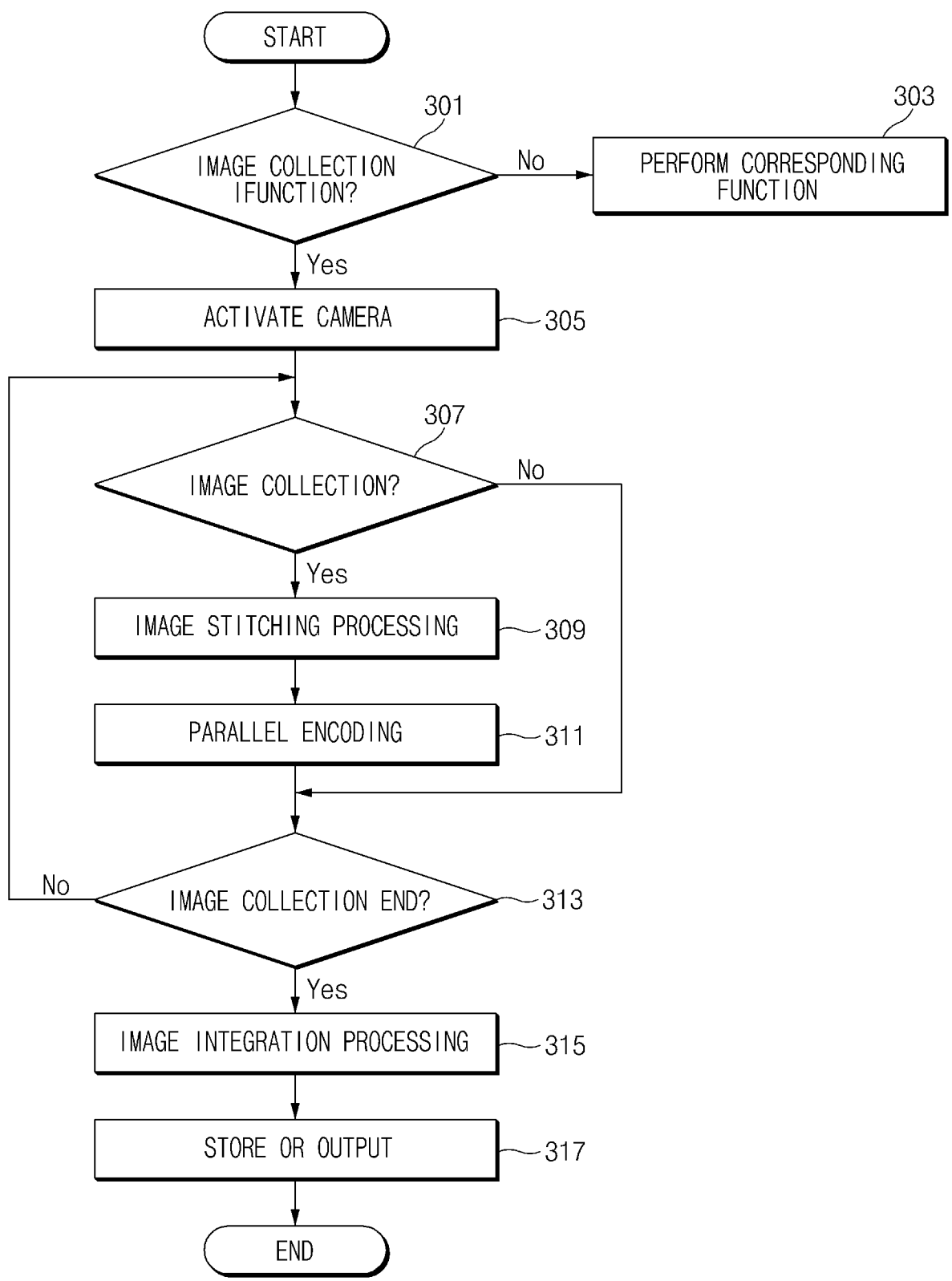
FIG. 3 is a flowchart showing an image processing method according to an exemplary embodiment of the present disclosure.

FIG. 3 is a flowchart showing an image processing method according to an exemplary embodiment of the present disclosure.

Referring to FIG. 3, in operation 301 associated with the image processing method according to an embodiment, the processor 120 (e.g., the image signal processing module 121) may perform an input event processing associated with an image collection function. When the user's input is not related to the image collection function, the processor 120 may perform a function corresponding to a type of the corresponding user's input in operation 303. For example, the processor 120 may perform a call function or receive the image from the server 106 or the external electronic devices 101 and 102 in response to the type of the user's input.

When receiving the input event associated with the image collection function (e.g., receiving from the input/output interface 150), the processor 120 (e.g., the image signal processing module 121) may activate the camera 180 in operation 305. The processor (e.g., the input buffer management module 123 or the output processing module 127) may output the specified user interface after the activation of the camera 180. The specified user interface may include, for example, the user interface associated with the specified content generation (e.g., the panoramic image generation).

In operation 307, the processor 120 (e.g., the image signal processing module 121) may identify whether the image is collected (e.g., whether the image is provided from the camera 180). When the image is provided from the camera 180, the processor 120 (e.g., the input buffer management module 123) may receive the image from the camera 180 and may maintain the received image in the form of stream. The processor 120 (e.g., the content generation module 125) may allocate the content generation buffer. The processor 120 may divide the content generation buffer into the partial areas of the specified size. For instance, the processor 120 may divide the content generation buffer into plural rows with respect to the direction in which at least some portions of the images are successively stored.

In operation 309, the processor (e.g., the content generation module 125) may perform the image stitching processing. The processor 120 may store the received image in the content generation buffer that is allocated in the specified size. The content generation module 125 may perform the image stitching processing between the collected image and the previous image. For instance, the content generation module 125 may select the image having the certain similarity with respect to the previous image and having the range of the similar area within the certain range among the images received after an initially acquired image or a previously stitched image. Based on this, the content generation module 125 may use the image having appropriate similar area range without using the similar image for the stitching operation, and thus the data may be processed with less computational effort (e.g., fewer image comparisons, selections, and color processings in the boundary area between the images) to attach the images.

In operation 311, the processor 120 (e.g., the encoder 129) may perform the parallel encoding. For example, the encoder 129 may perform the parallel encoding on each of the partial areas of the images stored in the content generation buffer. In this case, the encoder 129 may perform the parallel encoding on each of the partial areas of the current image areas, which are newly stitched, except for the previous image area that is previously encoded. In this regard, the partial area may include at least one sub-partial area corresponding to the encoding unit block. The number of sub-partial areas of the partial area may be changed depending on the size of the image, which is to be encoded, the performance of the processor, and the performance of the allocated thread. The encoder 129 may encode a start block of the current image areas, which are newly stitched, with reference to a last block of the previous image area.

In operation 313, the processor 120 (e.g., the image signal processing module 121) may identify whether the collection of the image is ended. When the collection of the image is not ended, the processor 120 (e.g., the image signal processing module 121, the input buffer management module 123, and the content generation module 125) may return to operation 307 and perform the above-mentioned operations from operation 307 again. For instance, the image signal processing module 121 may receive the image from the camera 180 and transmit the received image to the input buffer management module 123, and the input buffer management module 123 may transmit the received image to the content generation module 125.

When the collection of the image is ended, in operation 315, the processor 120 (e.g., the content generation module 125 and the encoder 129) may perform the image integration processing. For instance, the processor 120 may generate the header (e.g., the JPEG header) with respect to the specified blocks included in each of the partial areas and may place the generated header at the beginning of the data associated with the corresponding content. In addition, the processor 120 may define the encoded blocks for each partial area in the content generation buffer and may place the specified identifier (e.g., the restarter) at the end of the partial areas. The specified identifier may be used to direct the block reproduction in the beginning area of the next partial area to be processed independently without referring to the block placed in the end area of the previous partial area. The processor 120 may place the end identifier in an end area of the last partial areas among the partial areas of the content generation buffer to indicate the last block of the corresponding content.

In operation 317, the processor 120 (e.g., the encoder 129 or the output processing module 127) may store or output the content (e.g., the JPEG panoramic image) of the specified manner in the memory 130 or to the display 160.

Figure 4:
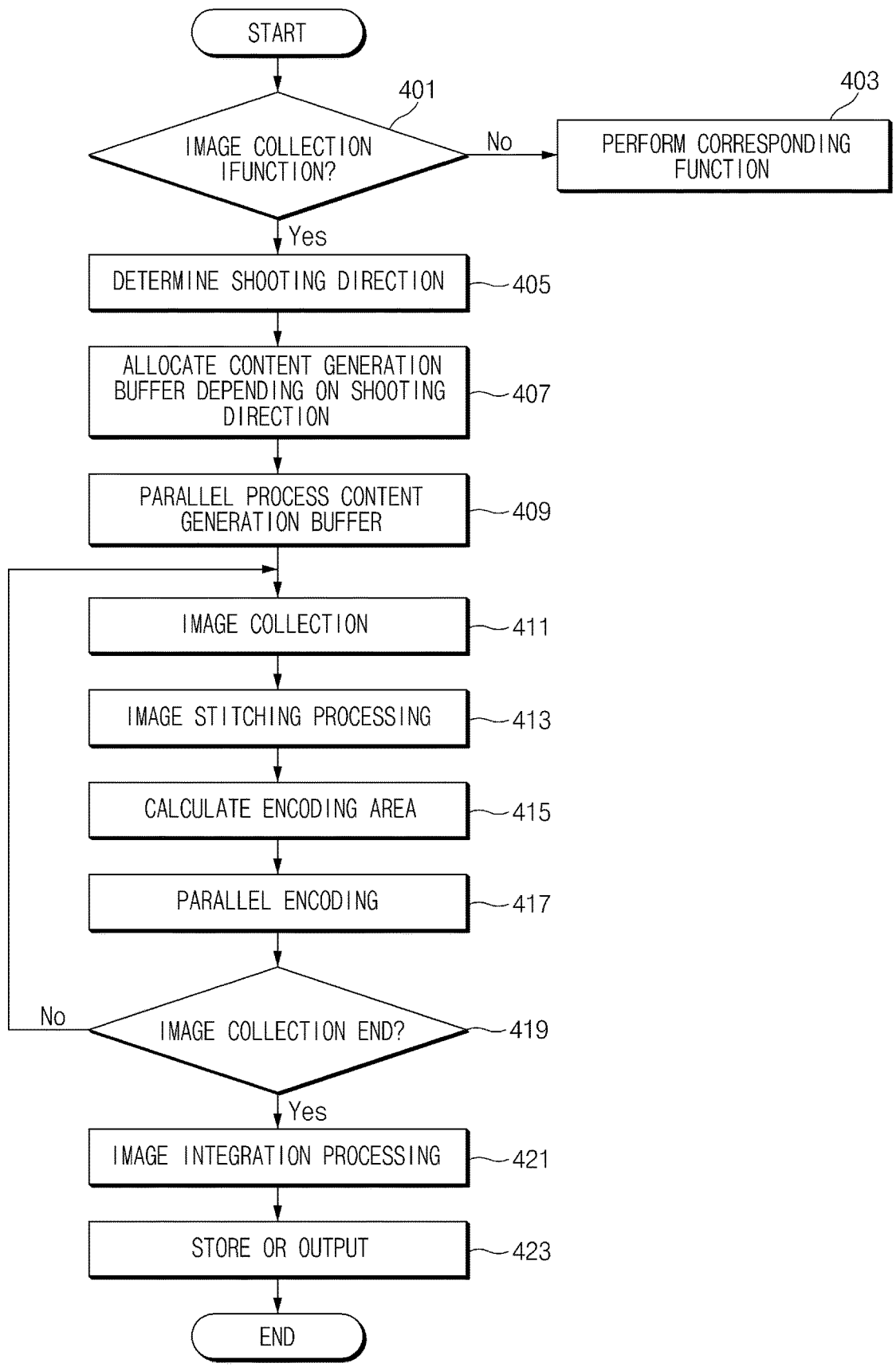
FIG. 4 is a flowchart showing an image processing method according to another exemplary embodiment of the present disclosure.

FIG. 4 is a flowchart showing an image processing method according to another exemplary embodiment of the present disclosure.

Referring to FIG. 4, in operation 401, the processor 120 (e.g., the image signal processing module 121) may perform an input event processing associated with an image collection function. When the user's input is not related to the image collection function, the processor 120 may perform a function corresponding to a type of the corresponding user's input in operation 403. For example, the processor 120 may perform a communication function, a file search function, a file reproduction function, or the like in response to the type of the user's input.

When the event associated with the image collection function occurs, the processor 120 (e.g., the image signal processing module 121) may activate the camera 180. After the camera 180 is activated, in operation 405, the processor (e.g., the input buffer management module 123) may determine the shooting direction (or the image acquiring direction). According to an embodiment, the processor 120 (e.g., the content generation module 125) may determine an initial shooting direction associated with the generation of the specified content (e.g., the panoramic image) using at least one sensor (e.g., the acceleration sensor or the geomagnetic sensor) included in the electronic device 100. For example, when the user moves or rotates the electronic device 100 to the left (or right) direction, the processor 120 may determine the shooting direction from the right to left direction (or from the left to right direction). According to various embodiments, the processor 120 may determine the shooting direction based on the preview image. For example, the processor 120 may analyze the movement direction of the image by comparing a preview image at a first time point (e.g., a time point at which the shooting of the panoramic image is requested) with a preview image input thereto after the first time point and may determine the shooting direction based on the analyzed result. In this regard, the processor 120 may output information, which guides the determination of the shooting direction associated with the generation of the specified content, to the display 160.

When the shooting direction is determined, in operation 407, the processor 120 (e.g., the content generation module 125) may allocate the content generation buffer depending on the shooting direction. The processor 120 may allocate the content generation buffer depending on the shooting direction such that the size or shape of the content generation buffer becomes different. For example, when the shooting direction is determined to be the first direction (e.g., the left-to-right direction), the processor 120 may allocate a first content generation buffer with a first size, and when the shooting direction is determined to be the second direction (e.g., the up-and-down direction), the processor 120 may allocate a second content generation buffer with a second size. The second size may be smaller than the first size. As another example, when the first content generation buffer and the second content generation buffer are allocated with a rectangular shape, a size of at least one side of the second content generation buffer may be smaller than a size of at least one side of the first content generation buffer. According to an embodiment, when processing an image of 3840 by 2160 (3840×2160), the processor 120 may allocate the content generation buffer of 3840 by 20000 (3840×20000) or the content generation buffer of 2160 by 20000 (2160×20000) depending on the shooting direction.

In operation 409, the processor 120 (e.g., the content generation module 125) may divide the content generation buffer into a plurality of areas. According to an embodiment, the processor 120 may divide the content generation buffer into the areas in association with the direction in which the image is successively stored. For instance, the processor 120 may divide the content generation buffer into the plural rows substantially parallel to a direction in which the image is stitched.

In operation 411, the processor 120 (e.g., the image signal processing module 121) may perform the image collection based on the user's input or a predetermined schedule. For instance, the processor 120 may receive the images, which are taken consecutively at regular intervals, from the camera 180.

In operation 413, the processor 120 (e.g., the content generation module 125) may process the image stitching (e.g., the image registration) and, additionally or alternatively, may process the image blending. For instance, the processor 120 may select an image, in which a range of similar area is out of or within a certain range when compared with a previous specified image, among the images and may stitch the selected image and the previous specified image. The previous specified image may be an image previously stored in the content generation buffer. For instance, the previous specified image may include an image initially acquired by the camera 180 and images stitched after the initially acquired image. In the image stitching operation, the processor 120 may perform the specified color processing (e.g., the blending) to display a more natural color in the boundary areas between the images.

In operation 415, the processor 120 (e.g., the encoder 129) may calculate an encoding area. For instance, the processor 120 may extract image areas newly stitched to the previously stored image as a new encoding area. In operation 417, the processor 120 (e.g., the encoder 129) may perform the parallel encoding. The processor 120 may encode the image areas extracted as the encoding area in the block unit of the specified size. In this operation, the processor 120 may encode a first block of the new image area with reference to a last block of the same partial area among the previously stored image areas.

For example, in the image processing operation associated with the first direction (e.g., a direction in which one side of the image has a pixel size of 3840), the processor 120 may perform the parallel encoding by allocating (uniformly allocating or non-uniformly allocating) the sub-partial areas (e.g., 240 sub-partial areas) corresponding to the encoding unit block (e.g., 16 by 16) to the certain number of threads (e.g., 6 threads). As another example, in the image processing operation associated with the second direction (e.g., a direction in which one side of the image has a pixel size of 2160), the processor 120 may perform the parallel encoding by allocating (non-uniformly allocating or uniformly allocating) the sub-partial areas (e.g., 135 sub-partial areas) corresponding to the encoding unit block (e.g., 16 by 16) to the certain number of threads (e.g., 6 threads). According to an embodiment, the processor 120 may allocate and encode relatively large number of sub-partial areas to the threads, which process the data faster than other threads. When the size of the image that is to be processed is reduced after the stitching, the processor 120 may divide the image with reduced size by the encoding unit block and allocate the sub-partial areas having the size of the encoding unit block to the specified number of the threads (e.g., each partial area) to perform the parallel encoding.

In operation 419, the processor 120 (e.g., the image signal processing module 121) may identify whether the collection of the image is ended. When the collection of the image is not ended, the processor 120 may return to operation 411 and may perform the above-mentioned operations from operation 411 again. When the collection of the image is ended, in operation 421, the processor 120 (e.g., the content generation module 125 and the encoder 129) may perform the image integration processing. In operation 423, the processor 120 (e.g., the encoder 129 or the output processing module 127) may store or output the content, on which the image integration processing is performed, in the memory 130 or to the display 160. The image integration processing operation and the storing or output operation may be performed in the same manner as operations 315 and 317 described in FIG. 3.

Operations (e.g., 301 to 317 or 401 to 423) in the process and method shown in FIGS. 3 and 4 may be performed sequentially, in parallel, repeatedly, or in a heuristic method. For example, the operations may be performed in different sequences, a portion of the operations may be omitted, or other operations may be added.

Figure 5:
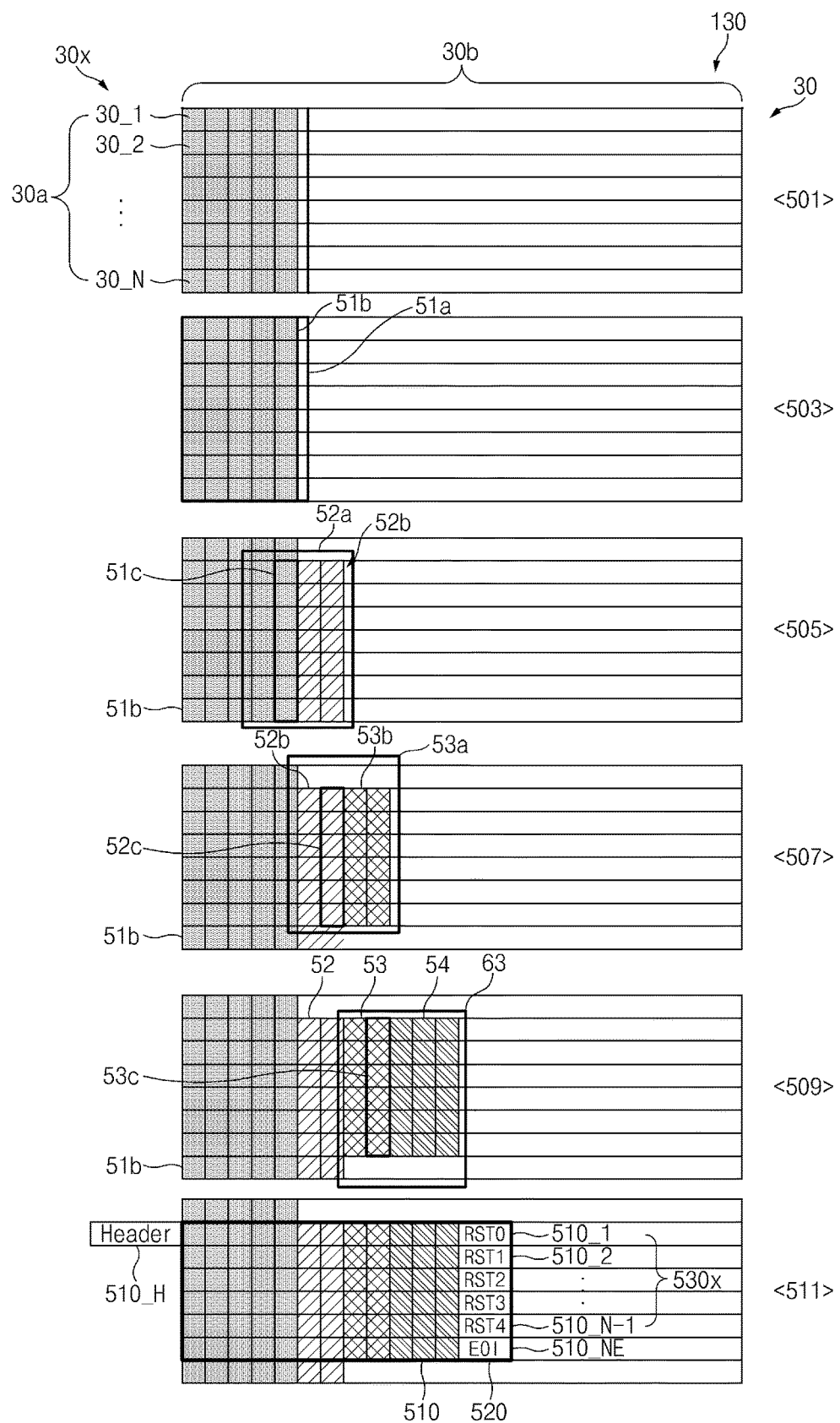
FIG. 5 is a view showing an operation of a memory according to an exemplary embodiment of the present disclosure.

FIG. 5 is a view showing an operation of a memory according to an exemplary embodiment of the present disclosure.

Referring to FIG. 5, the processor 120 (e.g., the input buffer management module 123) may allocate the content generation buffer 30 corresponding to the size of one content in the memory 130. The content generation buffer 30 may include, for example, a memory area corresponding to an area defined by a first side 30*a* having the same number of pixels as a length in the first direction of one image collected by the camera 180 or an image of a certain size according to the setting and a second side 30*b* having the number of pixels corresponding to the specified length in the second direction as shown in a state 501. The first side 30*a* may be divided into a plurality of partial areas 30*x*. The partial areas 30*x* may be areas divided to have a long length in a horizontal direction. For instance, the partial areas 30*x* may include a first partial area 30_1, a second partial area 30_2, . . . , and an N-th partial area 30_N. The number of partial areas 30*x* may be determined depending on the size of the specified block associated with the encoding. For example, as the number of pixels substantially simultaneously processed by the encoder 129 increases, the size of the block increases. In addition, the size of the partial areas may be changed depending on the size and number of the encoding unit blocks processed by the encoder 129.

Each of the partial areas 30*x* may have a width corresponding to the number of some pixels among the pixels arranged in the first direction (e.g., a width direction) of the image. For instance, when the image has a pixel size of 3840 by 2160 (3840×2160) and the size of the specified unit block associated with the encoding is 16 by 16 (16×16), the width of each of the partial areas 30*x* may have a size corresponding to 16 pixels and the number of partial areas 30*x* may be determined to be 240 (3840/16). When the number of partial areas 30*x* is determined, the processor 120 may divide each of the partial areas 30*x* into the block of the specified size (e.g., a block in which 40 sub-partial areas corresponding to the encoding unit blocks are allocated to correspond to the width of one partial area). In the embodiment, the size of the encoding unit block has been described in the form of a square block, but the size of the encoding unit block may be described in the form of a rectangular block in accordance with a method of design. The length of the partial areas 30*x* may be determined by policies related to the generated content. According to an embodiment, a length in the horizontal direction of the partial areas 30*x* may be defined by a certain pixel size, for example, 20000 pixel size. The length in the horizontal direction of the partial areas 30*x* may have a size corresponding to a smaller number of pixels or a size corresponding to a larger number of pixels depending on a setting of the content.

When a first image is received from the camera 180, the processor 120 may buffer the image in a first area 51*a* corresponding to the first image as shown in a state 503. The processor 120 may divide each partial area of the first area 51*a* into the block unit of the specified size and may encode first blocks 51*b*. In this case, the processor 120 may process the blocks of the specified size to be disposed in the first area 51*a*. For instance, the processor 120 may define the first blocks 51*b* such that the blocks do not overlap with a boundary area of the first area 51*a*. When the first blocks 51*b* are disposed in the first area 51*a*, the encoder 129 may perform the encoding on each of the partial areas 30*x*. In this case, the encoder 129 may perform the parallel encoding on the blocks of the specified size, which are disposed in each of the partial areas 30*x*. For instance, the encoder 129 may perform the parallel encoding on the provided partial areas (e.g., the sub-partial areas of the certain number form the one partial area) through the specified number of threads (e.g., 6 threads).

When a second image is received from the camera 180, a second area 52*a* corresponding to the second image may be disposed as shown in a state 505. In this case, the processor 120 may maintain the first blocks 51*b* in an area of the second area 52*a*, which overlaps with the first area 51*a*, and may dispose second blocks 52*b* of the specified size in a second image area, which does not overlap with the first area 51*a*, such that the second blocks 52*b* do not cross a boundary area of the second area 52*a*. Accordingly, in the second area 52*a*, the second blocks 52*b* adjacent to first edge blocks 51*c* placed at a right edge of the first area 51*a* may be disposed in the second area 52*a*.

The processor 120 may perform the encoding on the second blocks 52*b* with reference to the first edge blocks 51*c* (e.g., blocks, which are adjacent to the second blocks 52*b*, among the first blocks 51*b*). When performing the encoding on the second blocks 52*b*, the processor 120 may allocate the partial areas to the threads to perform the parallel encoding. The second image may be acquired by photographing a subject at a position relatively lower than a position at which the first image is photographed, and thus the second image may have a height different from that of the first image. Regarding to the generation of the content (e.g., the panoramic image) of the specified manner, the processor 120 may perform the stitching processing (e.g., at least one processing of the image registration or the blending) on an area in which the first image and the second image overlap with each other. After the stitching processing, the processor 120 may dispose the second blocks 52*b* associated with the encoding. When the size of the image that is to be encoded is reduced in the image stitching process, the processor 120 may equally redistribute the sub-partial areas of the reduced image to the specified number of threads or may allocate relatively large number of sub-partial areas to the threads, which process the data faster than other threads. For instance, when the sub-partial area (e.g., the area of the unit block size) of the first image in which the one side is 3840 pixels and the encoding is performed in the block unit of 16 by 16 (16×16) is 240, the processor 120 may allocate 40 sub-pixel areas to 6 threads to perform the parallel encoding. When the sub-partial area of the second image is reduced to 180 by the stitching process, the processor 120 may allocate 30 sub-partial areas to 6 threads and may perform the parallel encoding on each thread. As another way, the processor 120 may allocate 40 sub-partial areas to the threads, which process the data faster than other threads, and may allocate relatively small number of sub-partial areas to the threads, which process the data slower than other threads. In this operation, the processor 120 may collect information about a processing speed of each of the threads and may allow the number of sub-partial areas allocated to the threads to be different based on the collected information.

When a third image is received from the camera 180, a third area 53*a* corresponding to the third image may be disposed as shown in a state 507. In this case, the processor 120 may maintain the blocks of the first area 51*a* and the second area 52*a* in an area of the third area 53*a*, which overlaps with the first area 51*a* and the second area 52*a*. The processor 120 may dispose third blocks 53*b* of the specified size in a portion of a third image area, which does not overlap with the first area 51*a* and the second area 52*a*, such that the third blocks 53*b* do not cross a boundary area of the third area 53*a*. Accordingly, the third blocks 53*b* may be disposed to be adjacent to second edge blocks 52*c* disposed at a right edge of the second area 52*a*. The processor 120 may perform the parallel encoding on the third blocks 53*b* with reference to the second edge blocks 52*c*. The processor 120 may perform the stitching processing on the previous image and the third image before the third blocks 53*b* are disposed.

When a fourth image is received from the camera 180, a fourth area 54*a* corresponding to the fourth image may be disposed as shown in a state 509. The processor 120 may perform the stitching processing on the previous image and the fourth image and may dispose fourth blocks 54*b* adjacent to third edge blocks 53c disposed at a right edge of the third area 53a in the content generation buffer 30 as the above-described manner. The processor 120 may perform the parallel encoding on the fourth blocks 54b with reference to the third edge blocks 53c.

When the collection of the image is ended, the processor 120 may perform the integration processing on the encoded blocks. In this operation, the processor 120 may generate the content including a content data area 510 obtained by integrating the encoded first blocks 51b, the second blocks 52b, the third blocks 53b, and the fourth blocks 54b, header information 510_H about entire blocks associated with the content data area 510, and an identifier area 520 that includes specified identifiers 530x associated with a decoding manner and an end identifier 510_NE. The specified identifiers 510x may include a first specified identifier 510_1 disposed adjacent to a last block of the first partial area 30_1, a second specified identifier 510_2 disposed adjacent to a last block of the second partial area 30_2, . . . , and an (N−1)th specified identifier 510_N−1 disposed adjacent to a last block of an (N−1)th partial area 510_N−1. The end identifier 510_NE may be disposed at a last block of a last N-th partial area 30_N to indicate the end of the content.

In the above-mentioned descriptions, the images transmitted by the camera 180 are sequentially processed, but the present disclosure should not be limited thereto or thereby. For instance, the images, in which the range of the similar area is out of the certain range, among the images transmitted by the camera 180 may be ignored without being used for the stitching operation. As another way, the processor 120 may select the images (e.g., images in which the size of the similar area is within a range from about 30% to about 60% when compared with the previous image), in which the range of the similar area is within the certain range, among the images transmitted by the camera 180.

According to various embodiments, an image processing method by a processor of an electronic device is provided. The method may include dividing a content generation buffer allocated in association with a specified content generation into a plurality of partial areas, stitching a previous image and a present image with respect to an area in which a received present image overlaps with the previous image to store the stitched images in the content generation buffer, and performing a parallel encoding on each of the partial areas of the stitched images in a specified block size when the stitched images are stored in the content generation buffer. According to various embodiments, the method may further include at least one of determining an image acquiring direction associated with the content generation based on a variation in movement of received preview images or determining the image acquiring direction associated with the content generation using at least one sensor.

According to various embodiments, the method may further include allocating a content generation buffer having a different size depending on the shooting direction.

According to various embodiments, wherein the allocating of the content generation buffer includes allocating a content generation buffer having a first length in a first direction and a second length in a second direction with respect to a first shooting direction, and allocating a content generation buffer having a third length smaller than the first length in the first direction and the second length in the second direction with respect to a second shooting direction.

According to various embodiments, the method may further include outputting an image, which is to be acquired, to a background area of a display, and outputting the stitched images to the background area to be overlaid.

According to various embodiments, the method may further include outputting a preview area having a ratio corresponding to an entire size of the content generation buffer to a display during the image collection or after the image collection.

According to various embodiments, wherein the outputting includes outputting the preview area including a stitching area corresponding to the stitched images and a remaining area corresponding to the entire size of the content generation buffer.

According to various embodiments, the method may further include, when the image collection for the stitching is ended, disposing a specified identifier, which indicates that a last block of the partial area is not used for processing a first block of another partial area, in the last block of each of the partial areas, disposing an end identifier, which indicates a last block of a last partial area of the content, in an area adjacent to the last block of the last partial area of the content, and disposing header information corresponding to an entire content area in front of a first partial area.

According to various embodiments, wherein the stitching includes selecting and stitching an image, in which a similar area with respect to the pervious image is within a certain range, among received images.

According to various embodiments, the method may further include excluding an area of the present image having a height different from the previous image from a buffering of the content generation buffer when the image is stitched.

Figure 6:
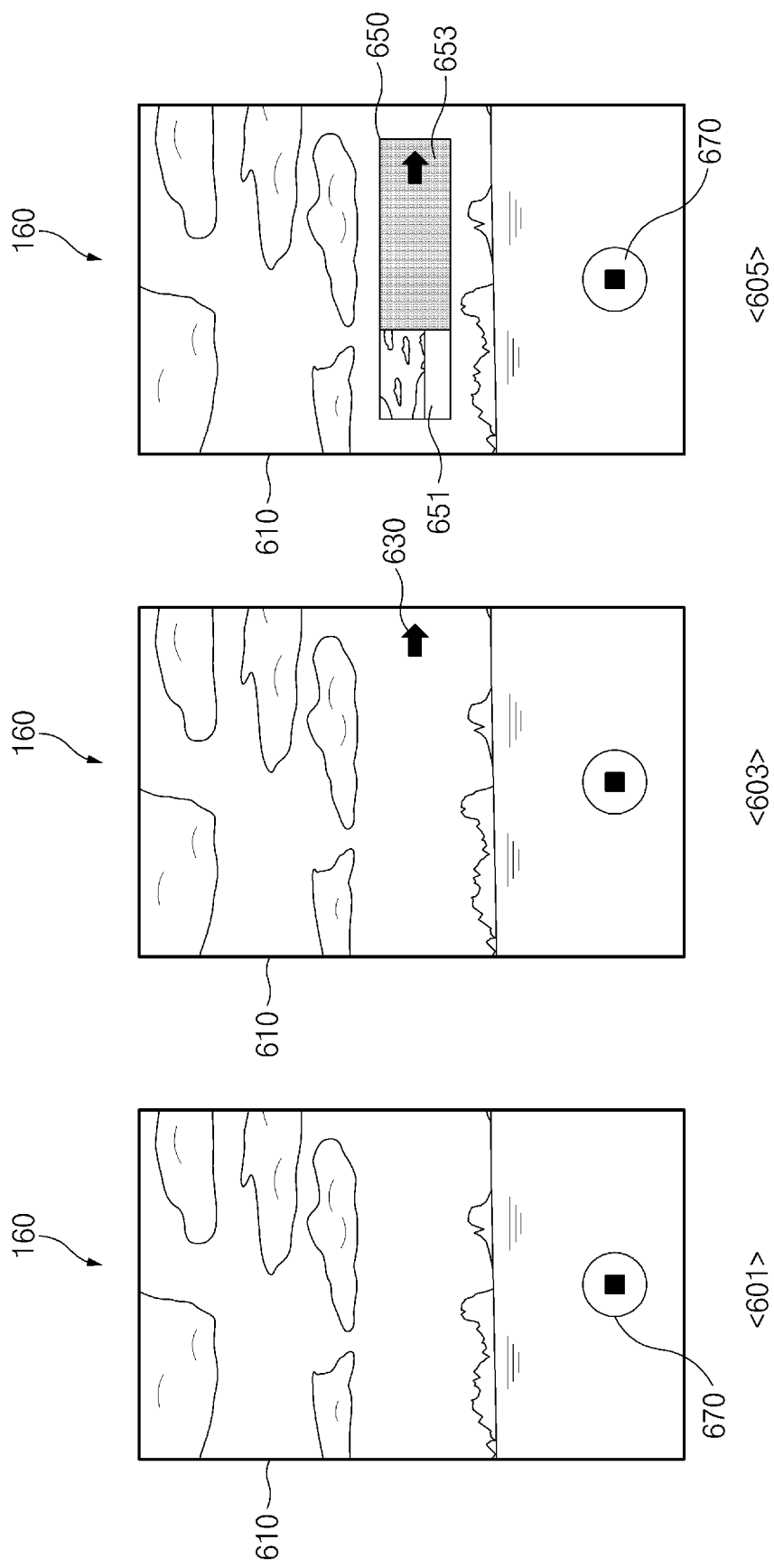
FIG. 6 is a view showing an interface associated with an image acquisition of an electronic device according to an exemplary embodiment of the present disclosure.

FIG. 6 is a view showing an interface associated with an image acquisition of an electronic device according to an exemplary embodiment of the present disclosure. In the following descriptions, the panoramic content will be described as the specified content.

Referring to FIG. 6, the electronic device 100 may activate the camera 180 in response to a user's input or a scheduled setting. When the camera 180 is activated, the display 160 of the electronic device 100 may display a preview screen of the camera 180, which is used to determine the shooting direction associated with the generation of the panoramic image, as a screen 601. According to various embodiments, the display 160 may display a menu item associated with the generation of the panoramic image through the preview screen displayed by the activation of the camera 180 and may display the preview screen associated with the determination of the shooting direction in response to a selection on the menu item as shown in FIG. 6. As shown in the screen 601, the display 160 may display a screen including a background area 610 or a progress indicator 670 in association with a corresponding panoramic image.

In the screen 601, when the electronic device 100 moves in one direction (e.g., a right direction), the shooting direction may be determined in the right. In response to this, the display 160 may display a direction indicating object 630 that indicates the determination of the shooting direction as shown in a screen 603. When the electronic device 100 moves in another direction (e.g., a left direction, an upper direction, or a lower direction), the direction indicating object 630 that indicates the determination of the shooting direction may be displayed to indicate another direction (e.g., the left direction, the upper direction, or the lower direction). The electronic device 100 may use a variation of the preview image acquired by using at least one sensor in association with the determination of the shooting direction.

When the shooting direction is determined and the electronic device 100 moves in the determined direction, at least some images of the images acquired by the camera 180 may be used to generate the specified panoramic image. In this operation, the electronic device 100 may display the partially stitched image through a preview area 650 as shown in a screen 605. The preview area 650 may have, for example, the same ratio as an overall size ratio of the panoramic image. The preview area 650 may include a stitching area 651 stitched by the acquired images and a remaining area 653 to be filled with the images which are to be acquired. According to various embodiments, the display 160 may display the progress indicator 670 indicating that the panoramic image is being photographed. When the photographing of the panoramic image is ended, the progress indicator 670 may be removed from the display 160. The electronic device 100 may end the photographing of the panoramic image when entire images corresponding to a size of the preview area 650 are acquired, or the electronic device 100 may end the photographing of the panoramic image in response to a specified end input (e.g., a specified time lapses or a virtual button indicating the end of the photographing is selected). When the stitched size of the acquired images is smaller than the preview area 650, the electronic device 100 may expand the stitched image to have a size corresponding to the entire size of the preview area 650. As another way, the electronic device 100 may generate the stitched image with a small size as the panoramic image. In this case, the panoramic image having a relatively shorter length when compared with an entire length of the preview image 650 may be generated.

According to various embodiments, the electronic device 100 may perform the encoding at every time point at which the acquired images are stitched, and thus the electronic device 100 may rapidly store the panoramic image by integrating the encoded data right after the photographing of the panoramic image is ended. The output processing module 127 of the electronic device 100 may output the images, which are received by the input buffer management module 123, to the display 160. In addition, the output processing module 127 of the electronic device 100 may output the data being generated as panorama provided from the content generation module 125, to the preview area 650 of the display 160. The image displayed in the stitching area 651 may be an image (e.g., a thumbnail image) acquired by scaling the blocks encoded by the encoder 129.

Figure 7:
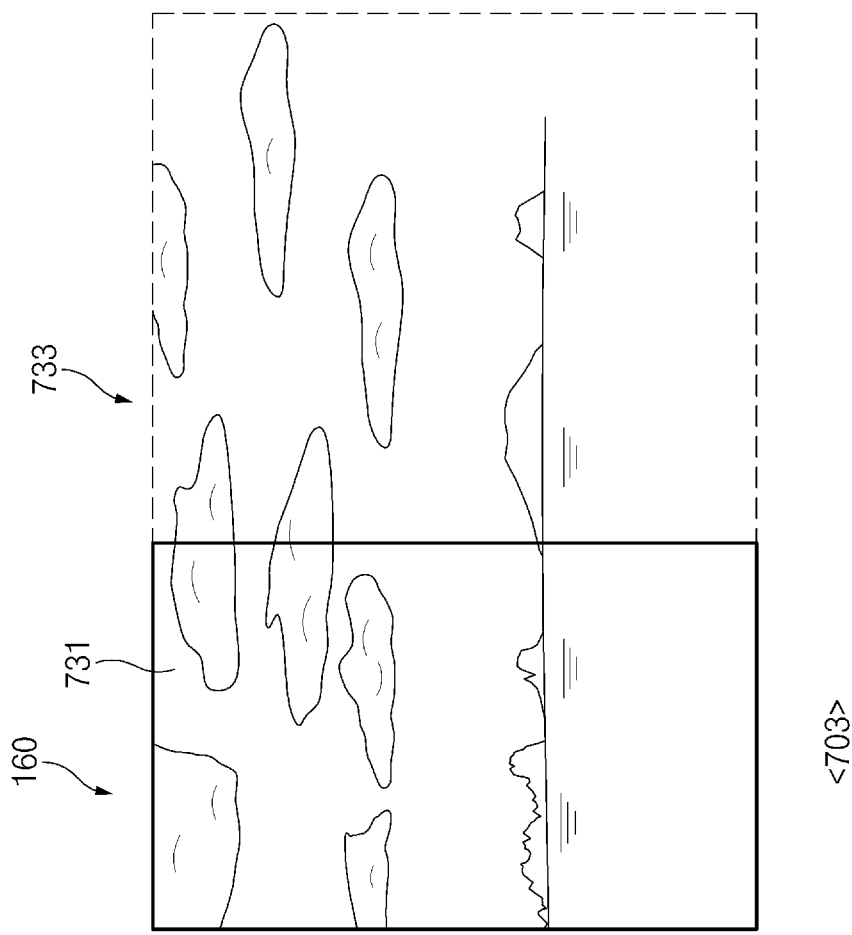
FIG. 7 is a view showing an interface associated with an image reproduction of an electronic device according to an exemplary embodiment of the present disclosure.
Figure 7:
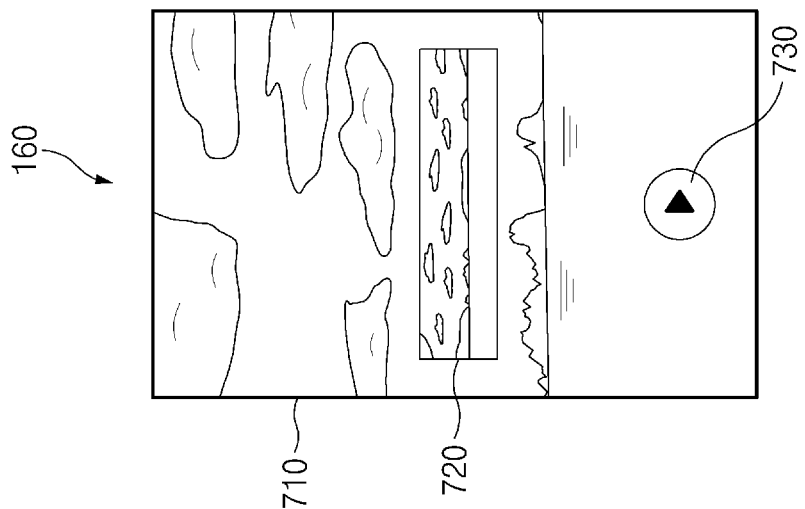

FIG. 7 is a view showing an interface associated with an image reproduction of an electronic device according to an exemplary embodiment of the present disclosure.

Referring to FIG. 7, the display 160 of the electronic device 100 may display the user interface in association with the reproduction of the panoramic image. In this regard, the electronic device 100 may output an icon or file image associated with at least one panoramic image. For example, the electronic device 100 may output a plurality of file icons when a gallery function or an image reproducing function is selected. In this case, a file icon corresponding to the panoramic image may have a shape different from a shape of a file icon corresponding to a still image. When the file icon associated with the panoramic image is selected, as shown in a screen 701, the display 160 may display a screen including a background area 710, a preview area 720, and a virtual reproduction button 730 with respect to the corresponding panoramic image.

When the virtual reproduction button 730 is selected, as shown in a screen 703, the electronic device 100 may output the panoramic image through the display 160 and may automatically move the panoramic image on the display 160 such that a panoramic image, which is not yet displayed, is displayed through the display 160. For instance, in the image, a first screen 731 being displayed through the display 160 may move from a right to left direction, and thus a second screen 733 may be displayed through the display 160. When a rightmost area of the panoramic image is displayed through the display 160 after the panoramic image moving from the right to left direction is displayed, the electronic device 100 may automatically display the panoramic image moving from a left to right direction.

According to various embodiments, an electronic device may include memory storing a plurality of images and a panorama image generated by the plurality of images, processor electrically connected to the memory, wherein the processor is configured to store, in the memory, a certain image in the generation of the panorama image, generated a stitched image based on the certain image and selected the image which is to be stitched, classify the stitched image to a plurality partial areas, and perform a parallel encoding on each of the partial areas in a specified block size.

According to various embodiments, wherein the processor is configured to parallel encoding on each of new added partial areas of the stitched image in a specified block size whenever stitching operation.

According to various embodiments, an electronic device may include a camera providing a plurality of images related to a panorama image sequentially, a memory storing the plurality of image provided by the camera, a processor electrically connected to the camera and the memory, wherein the processor is configured to divide a content generation buffer allocated in association with a specified content generation into a plurality of partial areas, stitch a previous image and a present image whenever image is received, perform a buffering of the stitched image in the content generation buffer and perform a parallel encoding stitched parts corresponding to the partial areas in a specified block size.

According to various embodiments, wherein the processor is configured to, when the received image is a first image of the panorama image, perform a parallel encoding stitched parts corresponding to the partial areas in a specified block size after performing a buffering of the received image in the content generation buffer.

According to various embodiments, wherein the processor is configured to stitch parts of present image concatenate to a previous image, perform a parallel encoding the stitched parts corresponding to the partial areas in a specified block size after performing a buffering of the received image in the content generation buffer.

According to various embodiments, an electronic device may include a camera providing a plurality of images related to a panorama image sequentially, a memory storing the plurality of image provided by the camera, a processor electrically connected to the camera and the memory, wherein the processor is configured to, when a captured direction of a panorama image is decided, allow a content generation buffer corresponding to the captured direction, wherein the allowing the content generation may include dividing a content generation buffer allocated in association with a specified content generation into a plurality of partial areas, while images are received and the received images are stored in the content generation buffer, perform a parallel encoding images stored in the partial areas in a specified block size whenever a first image and stitched image are stored in the content generation buffer.

Figure 8:
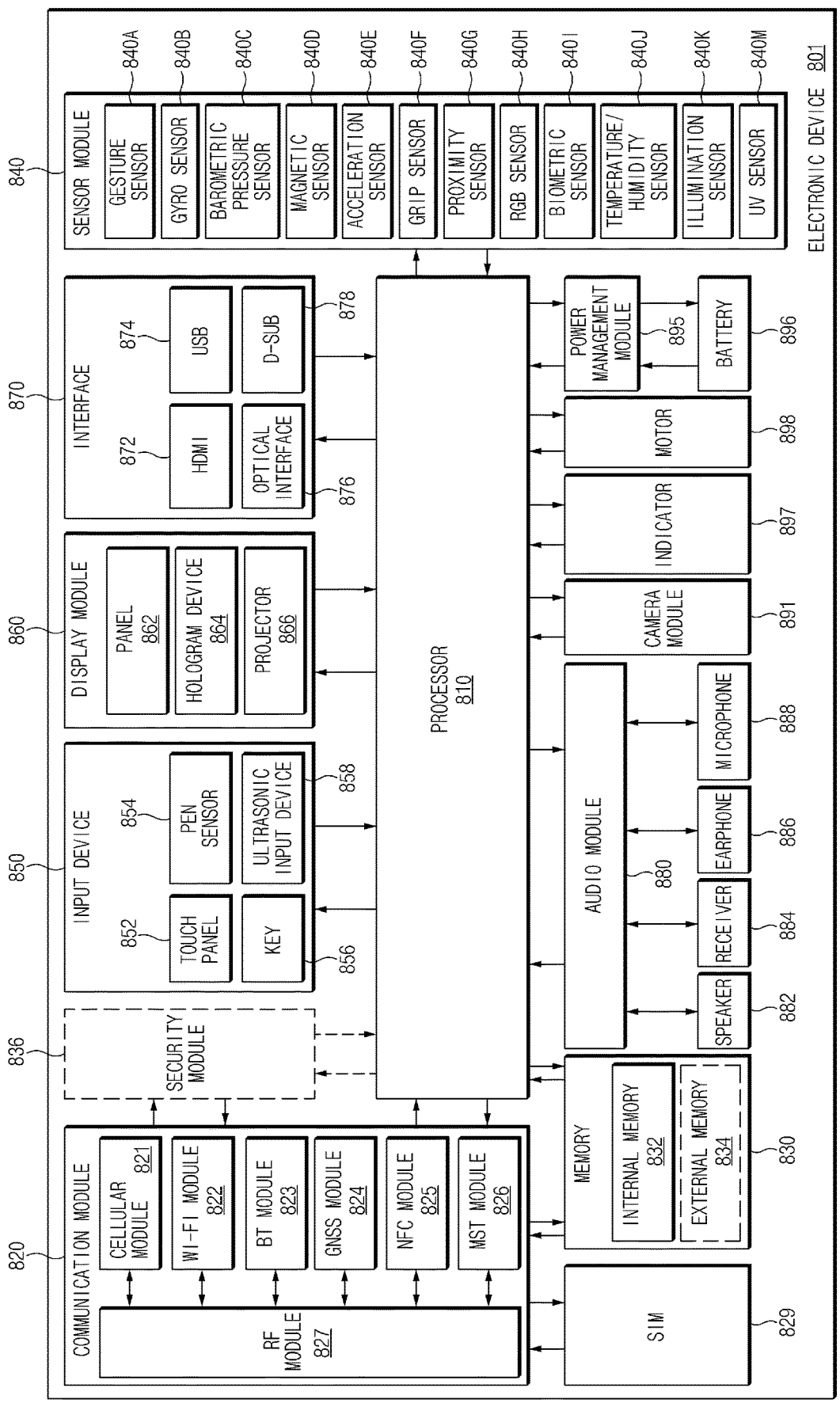
FIG. 8 is a block diagram illustrating a configuration of an electronic device according to various embodiments.

FIG. 8 is a block diagram illustrating a configuration of an electronic device according to various embodiments.

Referring to FIG. 8, the electronic device 801 may include, for example, all or part of an electronic device 100 shown in FIG. 1. The electronic device 801 may include one or more processors 810 (e.g., application processors (APs)), a communication module 820, a subscriber identification module (SIM) 829, a memory 830, a security module 836, a sensor module 840, an input device 850, a display 860, an interface 870, an audio module 880, a camera module 891, a power management module 895, a battery 896, an indicator 897, and a motor 898. The electronic device 801 may further include secure module selectively 836.

The processor 810 may drive, for example, an operating system (OS) or an application program to control a plurality of hardware or software components connected thereto and may process and compute a variety of data. The processor 810 may be implemented with, for example, a system on chip (SoC). According to an embodiment, the processor 810 may include a graphic processing unit (GPU) (not shown) and/or an image signal processor (not shown). The processor 810 may include at least some (e.g., a cellular module 821) of the components shown in FIG. 8. The processor 810 may load a command or data received from at least one of other components (e.g., a non-volatile memory) into a volatile memory to process the data and may store various data in a non-volatile memory.

The communication module 820 may have the same or similar configuration to a communication interface 1370 of FIG. 13. The communication module 820 may include, for example, the cellular module 821, a wireless-fidelity (Wi-Fi) module 822, a Bluetooth (BT) module 823, a global navigation satellite system (GNSS) module 824 (e.g., a GPS module, a Glonass module, a Beidou module, or a Galileo module), a near field communication (NFC) module 825, an MST module 826, and a radio frequency (RF) module 827.

The cellular module 821 may provide, for example, a voice call service, a video call service, a text message service, or an Internet service, and the like through a communication network. According to an embodiment, the cellular module 821 may identify and authenticate the electronic device 801 in a communication network using the SIM 829 (e.g., a SIM card). According to an embodiment, the cellular module 821 may perform at least part of functions which may be provided by the processor 810. According to an embodiment, the cellular module 821 may include a communication processor (CP).

The Wi-Fi module 822, the BT module 823, the GNSS module 824, the NFC module 825, or the MST module 826 may include, for example, a processor for processing data transmitted and received through the corresponding module. According to various embodiments, at least some (e.g., two or more) of the cellular module 821, the Wi-Fi module 822, the BT module 823, the GNSS module 824, the NFC module 825, or the MST module 826 may be included in one integrated chip (IC) or one IC package.

The RF module 827 may transmit and receive, for example, a communication signal (e.g., an RF signal). Though not shown, the RF module 827 may include, for example, a transceiver, a power amplifier module (PAM), a frequency filter, or a low noise amplifier (LNA), or an antenna, and the like. According to another embodiment, at least one of the cellular module 821, the Wi-Fi module 822, the BT module 823, the GNSS module 824, the NFC module 825, or the MST module 826 may transmit and receive an RF signal through a separate RF module.

The SIM 829 may include, for example, a card which includes a SIM and/or an embedded SIM. The SIM 829 may include unique identification information (e.g., an integrated circuit card identifier (ICCID)) or subscriber information (e.g., an international mobile subscriber identity (IMSI)).

The memory 830 (e.g., a memory 130 of FIG. 1) may include, for example, an embedded memory 832 or an external memory 834. The embedded memory 832 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 834 may include a flash drive, for example, a compact flash (CF), a secure digital (SD), a micro-SD, a mini-SD, an extreme digital (xD), a multimedia car (MMC), or a memory stick, and the like. The external memory 834 may operatively and/or physically connect with the electronic device 801 through various interfaces.

The secure module 836 may be a module which has a relatively higher secure level than the memory 830 and may be a circuit which stores secure data and guarantees a protected execution environment. The secure module 836 may be implemented with a separate circuit and may include a separate processor. The secure module 836 may include, for example, an embedded secure element (eSE) which is present in a removable smart chip or a removable SD card or is embedded in a fixed chip of the electronic device 801. Also, the secure module 836 may be driven by an OS different from the OS of the electronic device 801. For example, the secure module 836 may operate based on a java card open platform (JCOP) OS.

The sensor module 840 may measure, for example, a physical quantity or may detect an operation state of the electronic device 801, and may convert the measured or detected information to an electric signal. The sensor module 840 may include at least one of, for example, a gesture sensor 840A, a gyro sensor 840B, a barometer sensor 840C, a magnetic sensor 840D, an acceleration sensor 840E, a grip sensor 840F, a proximity sensor 840G, a color sensor 840H (e.g., red, green, blue (RGB) sensor), a biometric sensor 840I, a temperature/humidity sensor 840J, an illumination sensor 840K, or an ultraviolet (UV) sensor 840M. Additionally or alternatively, the sensor module 840 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 840 may further include a control circuit for controlling at least one or more sensors included therein. According to various embodiments, the electronic device 801 may further include a processor configured to control the sensor module 840, as part of the processor 810 or to be independent of the processor 810. While the processor 810 is in a sleep state, the electronic device 801 may control the sensor module 840.

The input device 850 may include, for example, a touch panel 852, a (digital) pen sensor 854, a key 856, or an ultrasonic input device 858. The touch panel 852 may use at least one of, for example, a capacitive type, a resistive type, an infrared type, or an ultrasonic type. Also, the touch panel 852 may further include a control circuit. The touch panel 852 may further include a tactile layer and may provide a tactile reaction to a user.

The (digital) pen sensor 854 may be, for example, part of the touch panel 852 or may include a separate sheet for recognition. The key 856 may include, for example, a physical button, an optical key, or a keypad. The ultrasonic input device 858 may allow the electronic device 801 to detect a sound wave using a microphone (e.g., a microphone 888) and to verify data through an input tool generating an ultrasonic signal.

The display 860 (e.g., a display 160 of FIG. 1) may include a panel 862, a hologram device 864, or a projector 866. The panel 862 may include the same or similar configuration to the display 160. The panel 862 may be implemented to be, for example, flexible, transparent, or wearable. The panel 862 and the touch panel 852 may be integrated into one module. The hologram device 864 may show a stereoscopic image in a space using interference of light. The projector 866 may project light onto a screen to display an image. The screen may be positioned, for example, inside or outside the electronic device 801. According to an embodiment, the display 860 may further include a control circuit for controlling the panel 862, the hologram device 864, or the projector 866.

The interface 870 may include, for example, a high-definition multimedia interface (HDMI) 872, a universal serial bus (USB) 874, an optical interface 876, or a D-sub-miniature 878. The interface 870 may be included in, for example, a communication interface 170 shown in FIG. 1. Additionally or alternatively, the interface 870 may include, for example, a mobile high definition link (MHL) interface, an SD card/multimedia card (MMC) interface, or an infrared data association (IrDA) standard interface.

The audio module 880 may convert a sound and an electric signal in dual directions. At least part of components of the audio module 880 may be included in, for example, an input and output interface 150 (or a user interface) shown in FIG. 13. The audio module 880 may process sound information input or output through, for example, a speaker 882, a receiver 884, an earphone 886, or the microphone 888, and the like.

The camera module 891 may be a device which captures a still image and a moving image. According to an embodiment, the camera module 891 may include one or more image sensors (not shown) (e.g., a front sensor or a rear sensor), a lens (not shown), an image signal processor (ISP) (not shown), or a flash (not shown) (e.g., an LED or a xenon lamp).

The power management module 895 may manage, for example, power of the electronic device 801. According to an embodiment, though not shown, the power management module 895 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 896 and voltage, current, or temperature thereof while the battery 896 is charged. The battery 896 may include, for example, a rechargeable battery or a solar battery.

The indicator 897 may display a specific state of the electronic device 801 or part (e.g., the processor 810) thereof, for example, a booting state, a message state, or a charging state, and the like. The motor 898 may convert an electric signal into mechanical vibration and may generate vibration or a haptic effect, and the like. Though not shown, the electronic device 801 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 9:
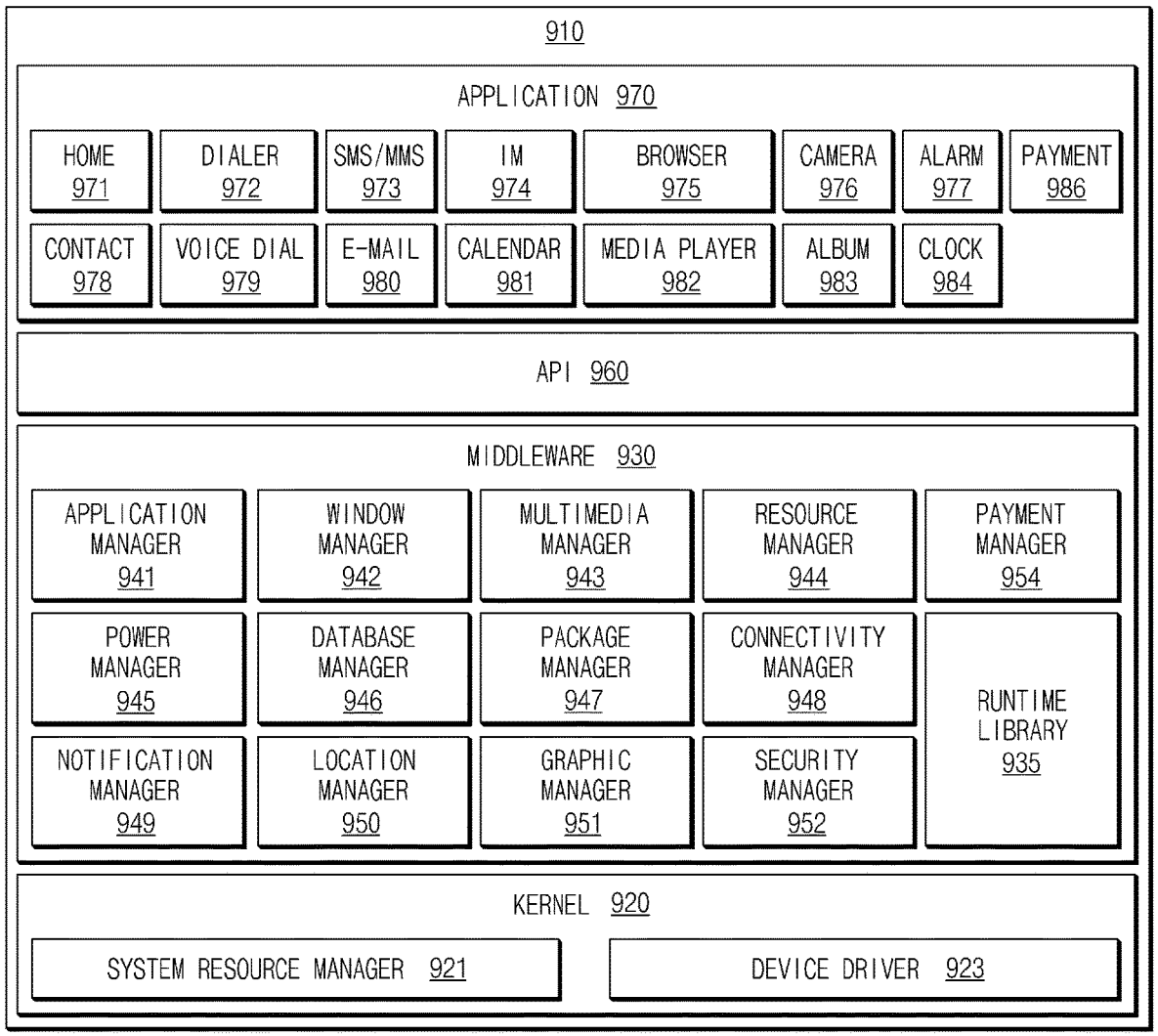
FIG. 9 is a block diagram illustrating a configuration of a program module according to various embodiments.

FIG. 9 is a block diagram illustrating a configuration of a program module according to various embodiments.

According to an embodiment, the program module 910 (e.g., a program 140 of FIG. 1) may include an operating system (OS) for controlling resources associated with an electronic device (e.g., an electronic device 100 of FIG. 1) and/or various applications (e.g., an application program 147 of FIG. 1) which are executed on the OS. The OS may be, for example, Android, iOS, Windows, Symbian, Tizen, or Bada, and the like.

The program module 910 may include a kernel 920, a middleware 930, an application programming interface (API) 960, and/or an application 970. At least part of the program module 910 may be preloaded on the electronic device, or may be downloaded from an external electronic device (e.g., a first external electronic device 102, a second external electronic device 104, or a server 106, and the like of FIG. 1).

The kernel 920 (e.g., a kernel 141 of FIG. 1) may include, for example, a system resource manager 921 and/or a device driver 923. The system resource manager 921 may control, assign, or collect, and the like system resources. According to an embodiment, the system resource manager 921 may include a process management unit, a memory management unit, or a file system management unit, and the like. The device driver 923 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 930 (e.g., a middleware 143 of FIG. 1) may provide, for example, functions the application 970 needs in common, and may provide various functions to the application 970 through the API 960 such that the application 970 efficiently uses limited system resources in the electronic device. According to an embodiment, the middleware 930 (e.g., the middleware 143) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, a security manager 952, or a payment manager 954.

The runtime library 935 may include, for example, a library module used by a compiler to add a new function through a programming language while the application 970 is executed. The runtime library 935 may perform a function about input and output management, memory management, or an arithmetic function.

The application manager 941 may manage, for example, a life cycle of at least one of the application 970. The window manager 942 may manage graphic user interface (GUI) resources used on a screen of the electronic device. The multimedia manager 943 may determine a format utilized for reproducing various media files and may encode or decode a media file using a codec corresponding to the corresponding format. The resource manager 944 may manage source codes of at least one of the application 970, and may manage resources of a memory or a storage space, and the like.

The power manager 945 may act together with, for example, a basic input/output system (BIOS) and the like, may manage a battery or a power source, and may provide power information utilized for an operation of the electronic device. The database manager 946 may generate, search, or change a database to be used in at least one of the application 970. The package manager 947 may manage installation or update of an application distributed by a type of a package file.

The connectivity manager 948 may manage, for example, wireless connection such as Wi-Fi connection or BT connection, and the like. The notification manager 949 may display or notify events, such as an arrival message, an appointment, and proximity notification, by a method which is not disturbed to the user. The location manager 950 may manage location information of the electronic device. The graphic manager 951 may manage a graphic effect to be provided to the user or a user interface (UI) related to the graphic effect. The security manager 952 may provide all security functions utilized for system security or user authentication, and the like. According to an embodiment, when the electronic device (e.g., an electronic device 100 of FIG. 1) has a phone function, the middleware 930 may further include a telephony manager (not shown) for managing a voice or video communication function of the electronic device.

The middleware 930 may include a middleware module which configures combinations of various functions of the above-described components. The middleware 930 may provide a module which specializes according to kinds of OSs to provide a differentiated function. Also, the middleware 930 may dynamically delete some of old components or may add new components.

The API 960 (e.g., an API 145 of FIG. 1) may be, for example, a set of API programming functions, and may be provided with different components according to OSs. For example, in case of Android or iOS, one API set may be provided according to platforms. In case of Tizen, two or more API sets may be provided according to platforms.

The application 970 (e.g., an application program 147 of FIG. 1) may include one or more of, for example, a home application 971, a dialer application 972, a short message service/multimedia message service (SMS/MMS) application 973, an instant message (IM) application 974, a browser application 975, a camera application 976, an alarm application 977, a contact application 978, a voice dial application 979, an e-mail application 980, a calendar application 981, a media player application 982, an album application 983, a clock application 984, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 970 may include an application (hereinafter, for better understanding and ease of description, referred to as "information exchange application") for exchanging information between the electronic device (e.g., the electronic device 100 of FIG. 1) and an external electronic device (e.g., the first external electronic device 102 or the second external electronic device 104). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 102 or the second external electronic device 104). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 102 or the second external electronic device 104) which communicates with the electronic device, an application which operates in the external electronic device, or a service (e.g., a call service or a message service) provided from the external electronic device.

According to an embodiment, the application 970 may include an application (e.g., the health card application of a mobile medical device) which is preset according to attributes of the external electronic device (e.g., the first external electronic device 102 or the second external electronic device 104). According to an embodiment, the application 970 may include an application received from the external electronic device (e.g., the server 106, the first external electronic device 102, or the second external electronic device 104). According to an embodiment, the application 970 may include a preloaded application or a third party application which may be downloaded from a server. Names of the components of the program module 910 according to various embodiments of the present disclosure may differ according to kinds of OSs.

According to various embodiments, at least part of the program module 910 may be implemented with software, firmware, hardware, or at least two or more combinations thereof. At least part of the program module 910 may be implemented (e.g., executed) by, for example, a processor (e.g., a processor 810 of FIG. 8). At least part of the program module 910 may include, for example, a module, a program, a routine, sets of instructions, or a process, and the like for performing one or more functions.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

According to various embodiments, the computer-readable storage media may include a memory storing at least one command and a processor executing the at least one command, the at least one command executed by the processor is configured to include dividing a content generation buffer allocated in association with a specified content generation into a plurality of partial areas, stitching a previous image and a present image with respect to an area in which a received present image overlaps with the previous image to store the stitched image in the content generation buffer, and performing a parallel encoding on each of the partial areas of the stitched image in a specified block size when the stitched images are stored in the content generation buffer.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The invention claimed is:

1. An electronic device comprising:
a memory; and
a processor electrically connected to the memory, wherein the processor is configured to:
store a first image in a content generation buffer in the memory, wherein the content generation buffer is divided into a plurality of partial areas;
perform parallel encoding, in a specified block size, on a first set of partial areas corresponding to the stored first image;
based on an operation that stitches the first image and a second image with respect to at least a portion of an area in which the second image overlaps with the first image, store at least part of the second image in the content generation buffer, wherein the at least part of the second image corresponds to an area of the second image that does not overlap with the first image;
perform parallel encoding, in the specified block size, on a second set of partial areas corresponding to the stored at least part of the second image; and
obtain an image based on the first set of partial areas and the second set of partial areas in the content generation buffer by ignoring stored at least one rows of the first set of partial areas that are not adjacent to stored rows of the second set of partial areas.

2. The electronic device of claim 1, wherein the processor is configured to:
determine an image acquiring direction associated with the content generation based on a variation in movement of received preview images; or
determine the image acquiring direction associated with the content generation using at least one sensor.

3. The electronic device of claim 2, wherein the processor is configured to allocate a different size depending on a shooting direction for the content generation buffer having.

4. The electronic device of claim 2, wherein the processor is configured to:
allocate a first length in a first direction and a second length in a second direction with respect to a first shooting direction for the content generation buffer, or
allocate a third length smaller than the first length in the first direction and the second length in the second direction with respect to a second shooting direction for the content generation buffer.

5. The electronic device of claim 1, wherein the processor is configured to:
output an image, which is to be acquired, to a background area of a display; and
output the stitched images to the background area to be overlaid.

6. The electronic device of claim 1, wherein the processor is configured to output a preview area having a ratio corresponding to an entire size of the content generation buffer to a display during an image collection or after the image collection.

7. The electronic device of claim 6, wherein the processor is configured to output the preview area including a stitching area corresponding to the stitched images and a remaining area corresponding to the entire size of the content generation buffer.

8. The electronic device of claim 1, wherein the processor is configured to, when image collection for the stitching is ended:

dispose a specified identifier, which indicates that a last block of the partial area is not used for processing a first block of another partial area, in the last block of each of the partial areas;

dispose an end identifier, which indicates the last block of a last partial area of the content, in an area adjacent to the last block of the last partial area of the content; and dispose header information corresponding to an entire content area in front of a first partial area.

9. The electronic device of claim 1, wherein the processor is configured to select and stitch the image, in which a similar area with respect to the first image is within a certain range, among received images.

10. The electronic device of claim 1, wherein the processor is configured to exclude an area of the second image having a height different from the first image from a buffering of the content generation buffer when the image is stitched.

11. An image processing method by a processor of an electronic device, the method comprising:

storing a first image in a content generation buffer in a memory, wherein the content generation buffer is divided into a plurality of partial areas;

performing parallel encoding, in a specified block size, on a first set of partial areas corresponding to the stored first image;

based on an operation that stitches the first image and a second image with respect to at least a portion of an area in which the second image overlaps with the first image, storing at least part of the second image in the content generation buffer, wherein the at least part of the second image corresponds to an area of the second image that does not overlap with the first image; and performing parallel encoding, in the specified block size, on a portion of a second set of partial areas corresponding to the stored at least part of the second image; and obtain an image based on the first set of partial areas and the second set of partial areas in the content generation buffer by ignoring stored at least one row of the first set of partial areas that are not adjacent to stored rows of the second set of partial areas.

12. The method of claim 11, further comprising at least one of determining an image acquiring direction associated with the content generation based on a variation in movement of received preview images or determining the image acquiring direction associated with the content generation using at least one sensor.

13. The method of claim 12, further comprising allocating a different size depending on a shooting direction for the content generation buffer.

14. The method of claim 13, wherein the allocating of the content generation buffer includes:

allocating a first length in a first direction and a second length in a second direction with respect to a first shooting direction for the content generation buffer; and allocating a third length smaller than the first length in the first direction and the second length in the second direction with respect to a second shooting direction for the content generation buffer.

15. The method of claim 11, further comprising:

outputting an image, which is to be acquired, to a background area of a display; and outputting the stitched images to the background area to be overlaid.

16. The method of claim 11, further comprising outputting a preview area having a ratio corresponding to an entire size of the content generation buffer to a display during an image collection or after the image collection.

17. The method of claim 16, wherein the outputting includes outputting the preview area including a stitching area corresponding to the stitched images and a remaining area corresponding to the entire size of the content generation buffer.

18. The method of claim 11, further comprising, when image collection for the stitching is ended:

disposing a specified identifier, which indicates that a last block of the partial area is not used for processing a first block of another partial area, in the last block of each of the partial areas;

disposing an end identifier, which indicates a last block of a last partial area of the content, in an area adjacent to the last block of the last partial area of the content; and disposing header information corresponding to an entire content area in front of a first partial area.

19. The method of claim 11, wherein the stitching includes selecting and stitching an image, in which a similar area with respect to the first image is within a certain range, among received images.

20. The method of claim 11, further comprising excluding an area of the second image having a height different from the first image from a buffering of the content generation buffer when the image is stitched.

21. The electronic device of claim 1, further comprising:

receiving another image, wherein the another image overlaps portions of some of the plurality of partial areas and does not overlap a remainder of the plurality of partial areas;

dividing the content generation buffer into another plurality of partial areas, wherein the number of the another plurality of partial areas is the number the some of the plurality of partial areas;

stitching at least a portion of the another image with the first image; and parallel encoding each of the another plurality of partial areas, wherein each of the another plurality of partial areas comprises fewer rows of blocks than the plurality of partial areas.

* * * * *